(12) United States Patent
Leary

(10) Patent No.: US 9,493,087 B2
(45) Date of Patent: Nov. 15, 2016

(54) METHOD AND SYSTEM FOR AUTOMATIC CHARGING OF ELECTRIC VEHICLES

(71) Applicant: PowerHydrant LLC, Westwood, MA (US)

(72) Inventor: Kevin Walter Leary, Westwood, MA (US)

(73) Assignee: PowerHydrant LLC, Westwood, MA (US)

( * ) Notice: Subject to any disclaimer, the term of this patent is extended or adjusted under 35 U.S.C. 154(b) by 222 days.

(21) Appl. No.: 14/453,893

(22) Filed: Aug. 7, 2014

(65) Prior Publication Data

US 2015/0042278 A1 Feb. 12, 2015

Related U.S. Application Data

(60) Provisional application No. 61/863,164, filed on Aug. 7, 2013.

(51) Int. Cl.
*H02J 7/00* (2006.01)
*B60L 11/18* (2006.01)
(Continued)

(52) U.S. Cl.
CPC ............ *B60L 11/1824* (2013.01); *B60L 1/003* (2013.01); *B60L 1/02* (2013.01); *B60L 1/14* (2013.01); *B60L 3/0069* (2013.01); *B60L 11/182* (2013.01); *B60L 11/185* (2013.01); *B60L 11/1818* (2013.01); *B60L 11/1825* (2013.01); *B60L 11/1827* (2013.01); *B60L 11/1829* (2013.01); *B60L 11/1835* (2013.01); *B60L 11/1842* (2013.01); *B60L 11/1844* (2013.01); *B60L 11/1846* (2013.01); *B60L 11/1848* (2013.01); *B60L 11/1862* (2013.01); *B60L 15/20* (2013.01); *B60L 2200/22* (2013.01); *B60L 2200/30* (2013.01); *B60L 2200/42* (2013.01); *B60L 2230/12* (2013.01); *B60L 2230/14* (2013.01); *B60L 2230/16* (2013.01); *B60L 2230/40* (2013.01); *B60L 2240/34* (2013.01); *B60L 2240/36* (2013.01); *B60L 2240/662* (2013.01); *B60L 2240/665* (2013.01); *B60L 2240/70* (2013.01); *B60L 2240/80* (2013.01); *B60L 2250/10* (2013.01); *B60L 2250/20* (2013.01);
(Continued)

(58) Field of Classification Search
USPC ........................................ 320/104, 108, 109
See application file for complete search history.

(56) References Cited

U.S. PATENT DOCUMENTS 5,202,617 A 4/1993 Nor
5,548,200 A 8/1996 Nor et al.
(Continued)

OTHER PUBLICATIONS

PCT International Search Report and Written Opinion for PCT/US2010/049907, dated Sep. 23, 2010, 10 pages.

*Primary Examiner* — Brian Ngo
(74) *Attorney, Agent, or Firm* — Atesa Legal LLC

(57) ABSTRACT

An electric charger resource sharing method and system comprise a charger that supplies electrical energy to a plurality of electric vehicles. The charger includes a robotic arm that articulates to be proximal to each of the electric vehicles for supplying the electrical energy to the electric vehicles and a docking interface at a distal end of the robotic arm that couples with a receptacle on each of the electric vehicles for transferring the electrical energy from the charger to the electric vehicles. A resource management device receives a bid from each electric vehicle, and allocates a portion of the electrical energy for a predetermined period of time to an electric vehicle of the plurality of electric vehicles in response to the bid of the electric vehicle.

16 Claims, 28 Drawing Sheets

(51) Int. Cl.
  *B60L 1/00*  (2006.01)
  *B60L 1/02*  (2006.01)
  *B60L 1/14*  (2006.01)
  *B60L 3/00*  (2006.01)
  *B60L 15/20* (2006.01)

(52) U.S. Cl.
  CPC ......... *B60L 2260/22* (2013.01); *B60L 2260/26* (2013.01); *B60L 2260/58* (2013.01); *B60L 2270/147* (2013.01); *B60L 2270/36* (2013.01); *Y02E 60/721* (2013.01); *Y02T 10/645* (2013.01); *Y02T 10/7005* (2013.01); *Y02T 10/705* (2013.01); *Y02T 10/7044* (2013.01); *Y02T 10/7088* (2013.01); *Y02T 10/72* (2013.01); *Y02T 10/7275* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y10S 901/30* (2013.01)

(56) References Cited

U.S. PATENT DOCUMENTS

| | | | |
|---|---|---|---|
| 5,581,171 A | 12/1996 | Kerfoot et al. | |
| 5,583,418 A | 12/1996 | Honda et al. | |
| 5,596,258 A | 1/1997 | Kimura et al. | |
| 5,614,808 A | 3/1997 | Konoya et al. | |
| 5,684,379 A | 11/1997 | Svedoff | |
| 5,742,229 A | 4/1998 | Smith | |
| 5,816,643 A | 10/1998 | Itou et al. | |
| 5,873,737 A | 2/1999 | Hashizawa et al. | |
| 5,906,500 A | 5/1999 | Kakuta et al. | |
| 5,969,507 A | 10/1999 | Meyer | |
| 6,157,162 A * | 12/2000 | Hayashi | B60L 11/1818 320/104 |
| 6,614,204 B2 | 9/2003 | Pellegrino et al. | |
| 7,576,544 B1 | 8/2009 | Hsu | |
| 8,120,310 B2 | 2/2012 | Littrell et al. | |
| 8,203,345 B2 | 6/2012 | Bertness | |
| 8,314,587 B2 | 11/2012 | White et al. | |
| 8,315,930 B2 | 11/2012 | Littrell | |
| 8,319,358 B2 | 11/2012 | Curry et al. | |
| 8,339,095 B2 | 12/2012 | Hayashi | |
| 2001/0002786 A1 | 6/2001 | Najima | |
| 2002/0008495 A1 | 1/2002 | Dougherty et al. | |
| 2003/0209375 A1 | 11/2003 | Suzuki | |
| 2003/0210014 A1 | 11/2003 | Jabaji et al. | |
| 2004/0130288 A1 | 7/2004 | Souther et al. | |
| 2004/0207362 A1 | 10/2004 | Kanouda et al. | |
| 2004/0232881 A1 | 11/2004 | Amano et al. | |
| 2007/0094069 A1 | 4/2007 | Berman | |
| 2007/0126395 A1 | 6/2007 | Suchar | |
| 2008/0052145 A1 | 2/2008 | Kaplan et al. | |
| 2008/0067974 A1 | 3/2008 | Zhang et al. | |
| 2008/0203973 A1 | 8/2008 | Gale et al. | |
| 2008/0228613 A1 | 9/2008 | Alexander | |
| 2008/0270227 A1 | 10/2008 | Al Amri | |
| 2009/0058355 A1 | 3/2009 | Meyer | |
| 2009/0079388 A1 * | 3/2009 | Reddy | B60L 11/1818 320/109 |
| 2009/0210357 A1 | 8/2009 | Pudar et al. | |
| 2009/0212745 A1 | 8/2009 | Kelty et al. | |
| 2009/0256523 A1 | 10/2009 | Taguchi | |
| 2009/0302801 A1 | 12/2009 | Katsunaga | |
| 2010/0082464 A1 | 4/2010 | Keefe | |
| 2010/0094496 A1 | 4/2010 | Hershkovitz et al. | |
| 2010/0145885 A1 | 6/2010 | Graziano et al. | |
| 2010/0207588 A1 | 8/2010 | Lowenthal et al. | |
| 2011/0254504 A1 * | 10/2011 | Haddad | B60L 11/1827 320/109 |
| 2013/0300358 A1 * | 11/2013 | Kirby | G06K 7/0008 320/108 |
| 2014/0266004 A1 * | 9/2014 | Andrews, Jr. | B60L 11/005 320/104 |
| 2015/0054460 A1 * | 2/2015 | Epstein | B60L 11/187 320/109 |

* cited by examiner

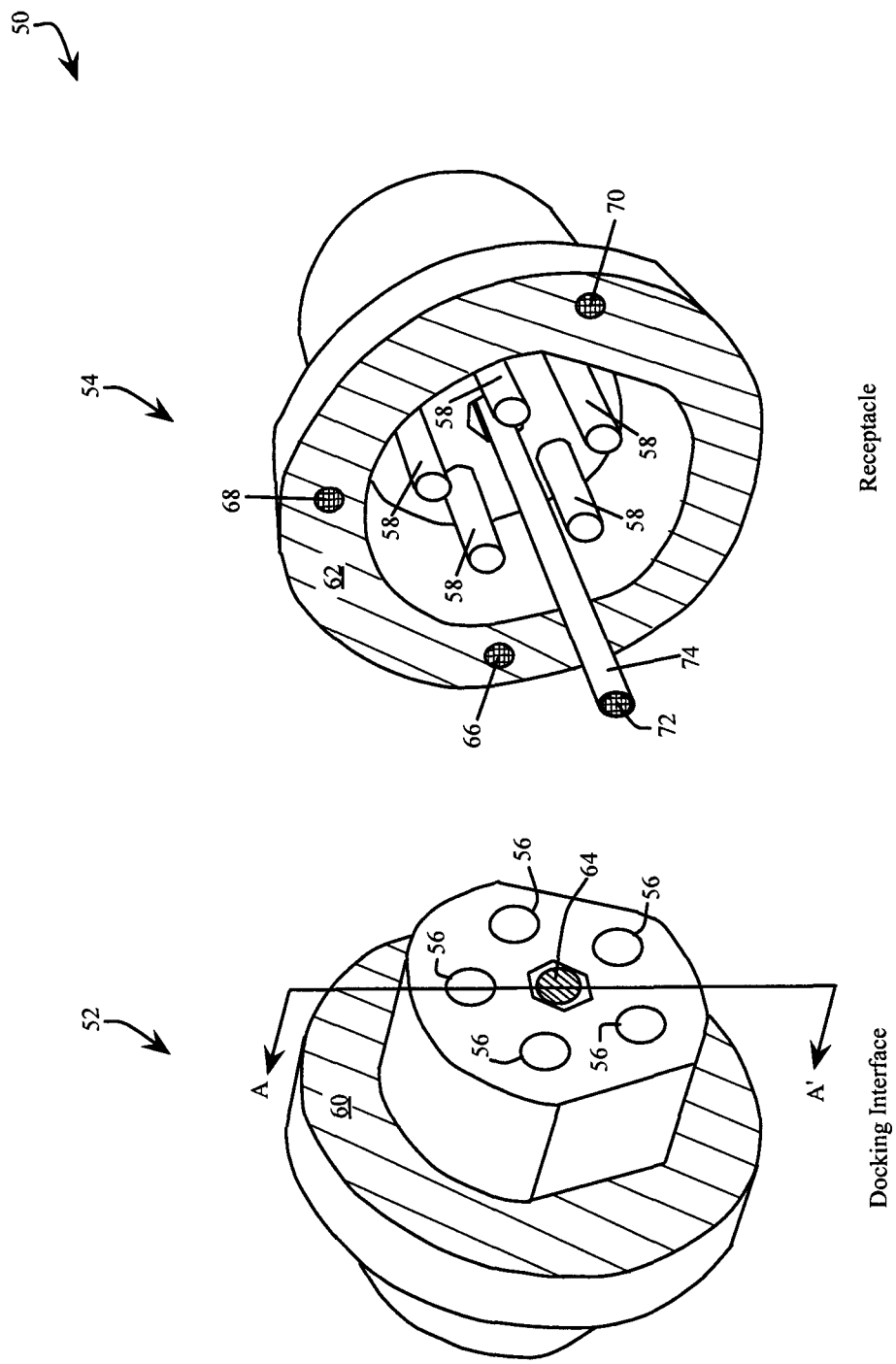

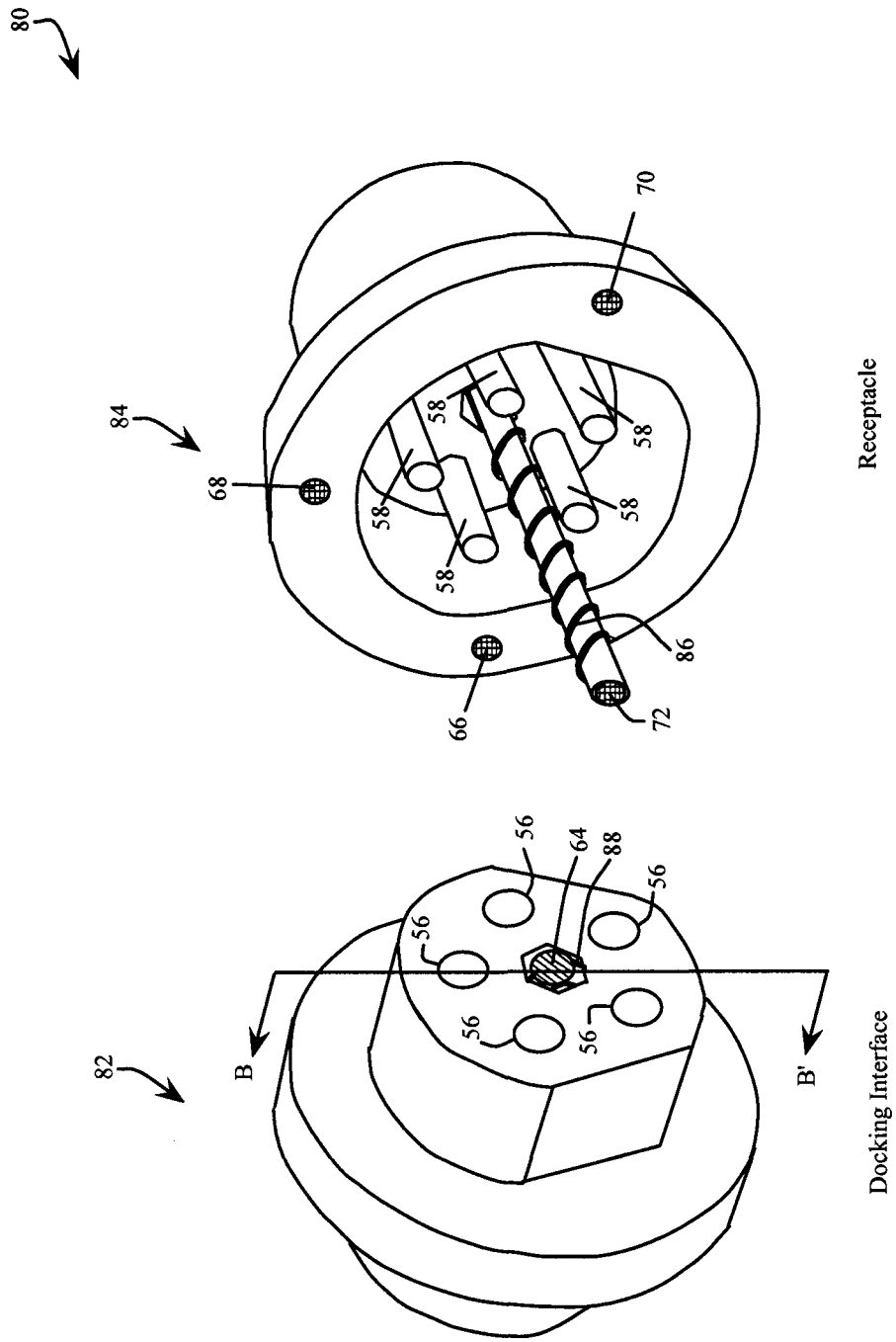

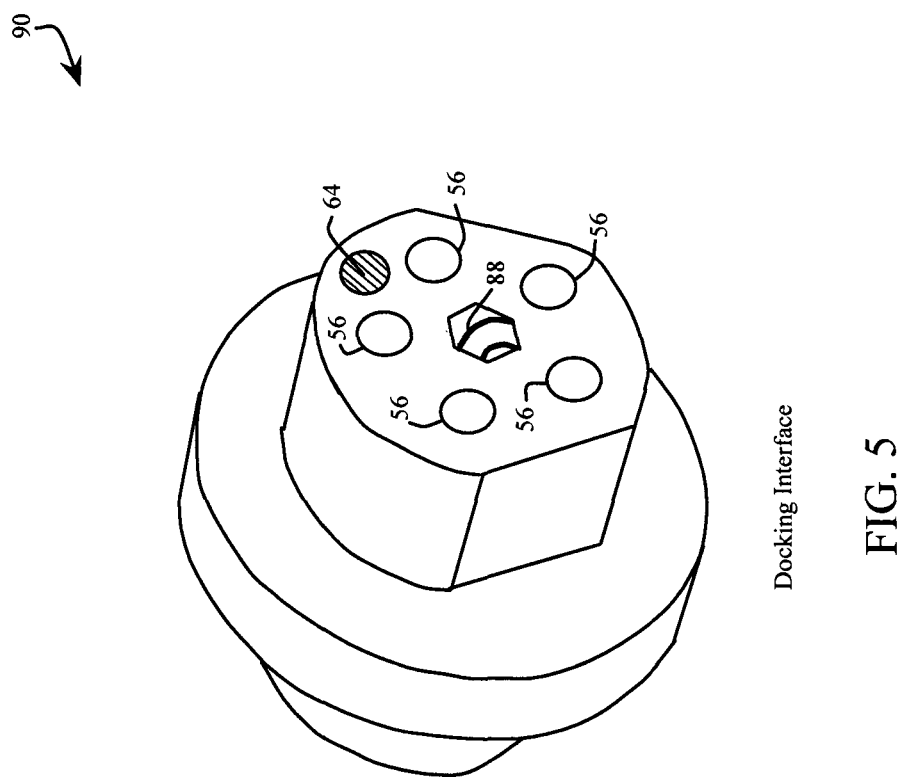

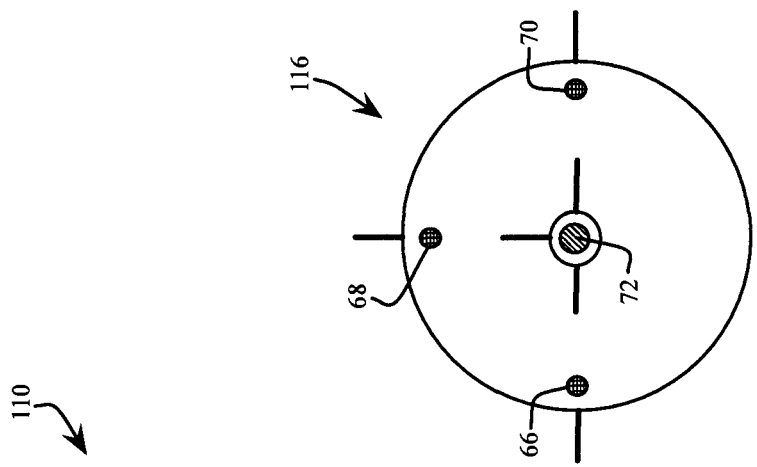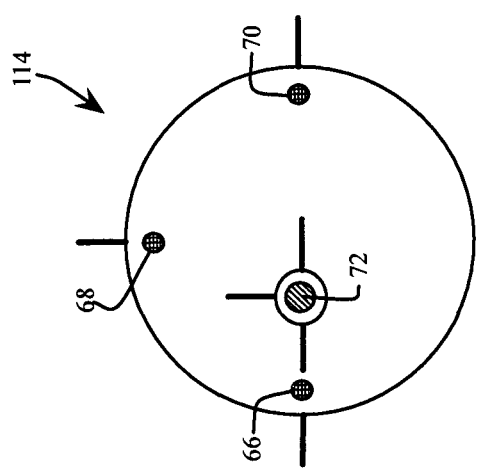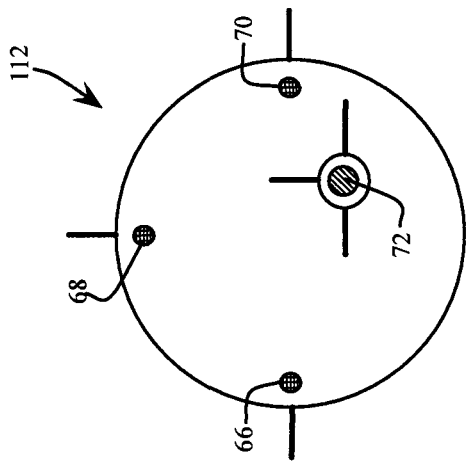

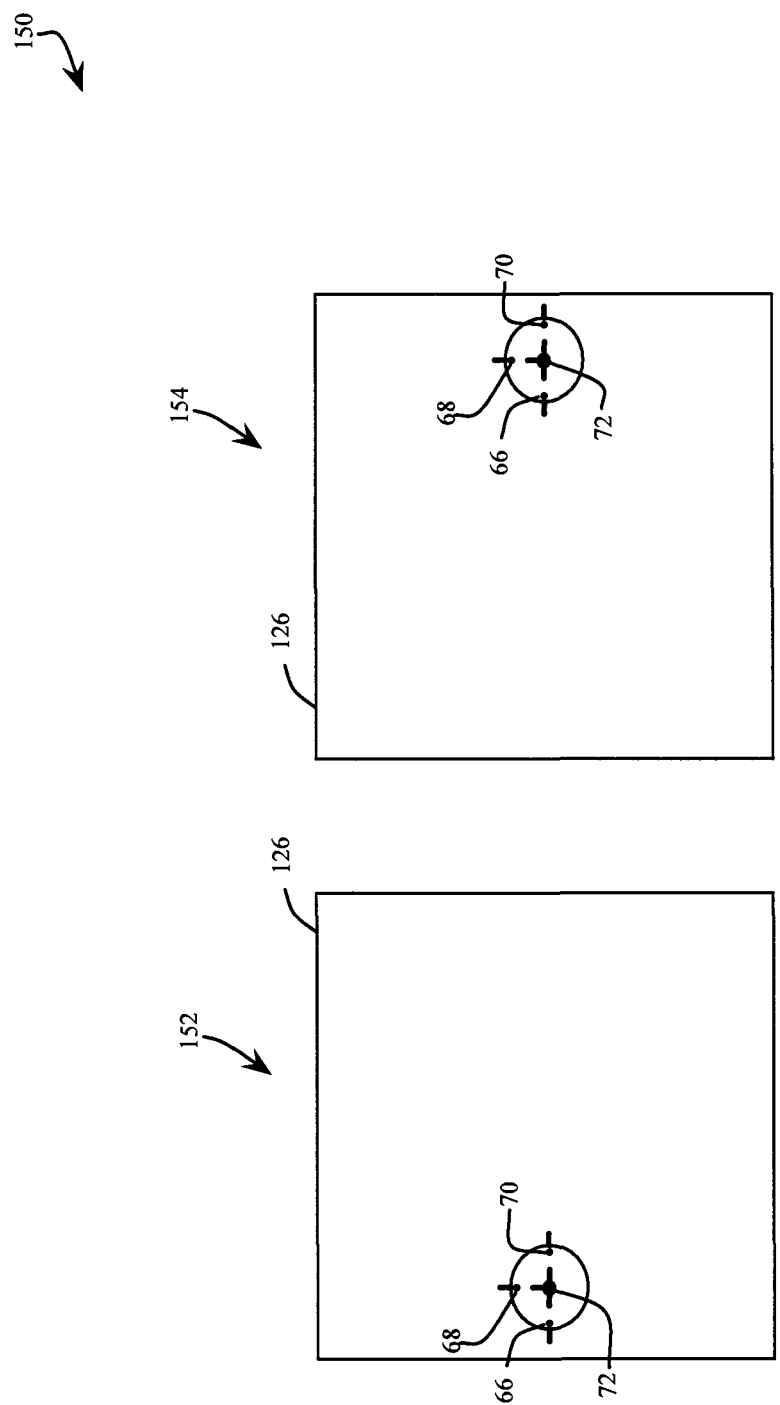

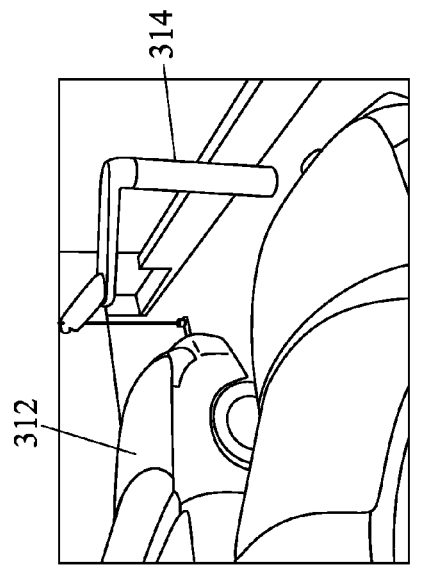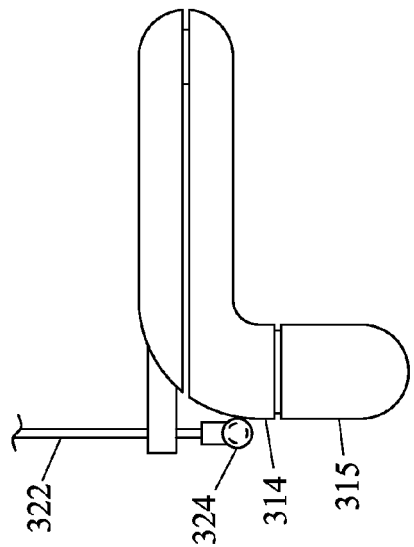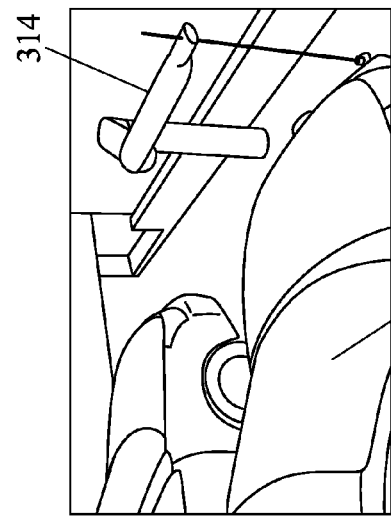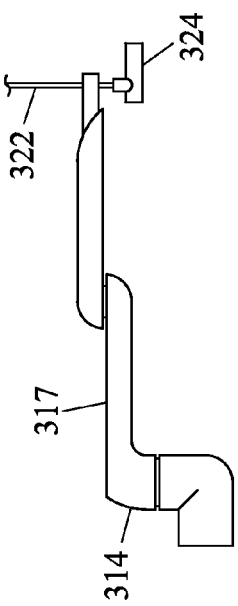
FIG. 15A
FIG. 15B

| Normal Charge Rate Long-term charging window (workplace charging) | | | | |
|---|---|---|---|---|
| 10kw charger, 21.25 kwh need, 8 hrs charging time window | | Traditional | PowerHydrant | advantage |
| w-h deliverable | whb | 80,000.00 | 80,000.00 | |
| w-h delivered | whd | 21,250.00 | 80,000.00 | |
| w-h demanded | whm | 21,250.00 | 85,000.00 | |
| aggregate customer satisfaction | acs = 1 - (whm - whd)/whm | 1.00 | 0.94 | |
| utility | whd/whb | 0.27 | 1.00 | 3.8 |
| maximizing satisfaction against capital cost "utility" | acs*whd/whb | 0.27 | 0.94 | 3.5 |

| Fast Charge Rate Short-term charging window (roadside charging) | | | | |
|---|---|---|---|---|
| 200kw, 21.5 kwh need, 30 minutes charging time window | | Traditional | PowerHydrant | advantage |
| w-h deliverable | whb | 100,000.00 | 100,000.00 | |
| w-h delivered | whd | 21,250.00 | 85,000.00 | |
| w-h demanded | whm | 21,250.00 | 85,000.00 | |
| aggregate customer satisfaction | acs = 1 - (whm - whd)/whm | 1.00 | 1.00 | |
| utility | whd/whb | 0.21 | 0.85 | 4.0 |
| maximizing satisfaction against capital cost "utility" | acs*whd/whb | 0.21 | 0.85 | 4.0 |

FIG. 21

METHOD AND SYSTEM FOR AUTOMATIC CHARGING OF ELECTRIC VEHICLES

CROSS-REFERENCE TO RELATED APPLICATIONS

This application is a utility application claiming priority to co-pending U.S. Provisional Application Ser. No. 61/863,164 filed on Aug. 7, 2013 entitled "METHOD AND SYSTEM FOR CHARGING ELECTRIC VEHICLES" the entirety of which is incorporated by reference herein. This application is related to U.S. Pat. No. 8,473,131 entitled "METHOD AND SYSTEM FOR CHARGING ELECTRIC VEHICLES," the entirety of which is incorporated by reference herein.

FIELD OF THE INVENTION

The invention relates generally to electric powered vehicles. More specifically, the invention relates to systems and methods for charging electric vehicles according to a dynamic allocation.

BACKGROUND

Electrically powered vehicles (EV) and battery electric vehicles (BEV) have numerous advantages over fossil fuel cars including reduced emission of pollutants and national dependency on foreign energy sources. Despite these advantages, EVs suffer from short driving range and long charging intervals due largely to battery technology limitations. Accordingly, both widespread adoption of EVs and a charging infrastructure has been limited. Hybrid electric vehicles (HEV) or plug-in hybrid electric vehicles (PHEV) attempt to mitigate the range and charging interval issues by providing an alternate power source, for example fossil fuel or hydrogen.

Typical electric charging stations require the vehicle user to manual connect the car to the station. With the required frequency of charging such manual intervention complicates vehicle ownership and thus vehicle adoption.

Another approach uses near field magnetic resonance induction. This approach suffers from electromagnetic interface and lower coupling efficiency between the power source and the vehicle.

To fully realize the potential of EVs and encourage their adoption, charging should occur with limited or no user intervention as an unconscious task. This requires an intelligent system to transfer power between a variety of power sources and the vehicle. In addition, there needs to be a way to appropriately bill for this service regardless of who is driving the vehicle as would occur with a rental fleet.

BRIEF SUMMARY

In one aspect, the invention features a method for charging an electric vehicle. The presence of an electric vehicle proximate to a charger is determined. The user account data associated with the electric vehicle is validated. A docking interface on the charger is aligned to a receptacle on the electric vehicle. The docking interface is coupled to the receptacle when a proximity is less than a predetermined distance. Power is supplied from the charger to the electric vehicle.

In another aspect, the invention features an electric charger resource sharing system, comprises a charger that supplies electrical energy to a plurality of electric vehicles. The charger includes a robotic arm that articulates to be proximal to each of the electric vehicles for supplying the electrical energy to the electric vehicles and a docking interface at a distal end of the robotic arm that couples with a receptacle on each of the electric vehicles for transferring the electrical energy from the charger to the electric vehicles. A resource management device receives a bid from each electric vehicle, and allocates a portion of the electrical energy for a predetermined period of time to an electric vehicle of the plurality of electric vehicles in response to the bid of the electric vehicle.

In another aspect, the invention features a method for selecting an electric vehicle for receiving an allocation of a charging resource. The method comprises selecting each of a plurality of electric vehicles as a candidate for receiving an allocation of a charging resource for a predetermined period of time; generating a bid value for each of the plurality of electric vehicles; and selecting one of the electric vehicles for receiving the allocation of the charging resource for the predetermined period of time in response to the bid value corresponding to the one of the electric vehicles.

In another aspect, the invention features a computer program product for selecting an electric vehicle for receiving an allocation of a charging resource, comprising: a computer readable storage medium having computer readable program code embodied therewith. The computer readable program code comprises computer readable program code configured to select each of a plurality of electric vehicles as a candidate for receiving an allocation of a charging resource for a predetermined period of time; computer readable program code configured to generate a bid value for each of the plurality of electric vehicles; and computer readable program code configured to select one of the electric vehicles for receiving the allocation of the charging resource for the predetermined period of time in response to the bid value corresponding to the one of the electric vehicles.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 3A is a perspective view of an embodiment of a docking interface.

FIG. 3B is a perspective view of an embodiment of a receptacle usable with the docking interface in FIG. 3A.

FIG. 4A is a perspective view of an embodiment of a docking interface.

FIG. 4B is a perspective view of an embodiment of a receptacle usable with the docking interface in FIG. 4A.

FIG. 5 is a perspective view of the embodiment of the docking interface in FIG. 4A modified to move the imager.

FIGS. 7A, 7B and 7C illustrate coaxial alignment using features on a receptacle.

FIGS. 10C and 10D illustrate the yaw alignment of a receptacle in the field of view.

FIG. 15A is a view of the charger of FIGS. 14A and 14B in a closed state, in accordance with some embodiments.

FIG. 15B is a view of the charger of FIGS. 14A, 14B, and 15A in an open state, in accordance with some embodiments.

FIG. 21 is a table illustrating a comparison of utilization of charger resources, in accordance with some embodiments.

DETAILED DESCRIPTION

Embodiments of charging methods and systems described herein provide for intelligent power management between a power grid and an electric vehicle (EV) including combinations of vehicle charging and use of the vehicle to return power to the grid. The embodiments described herein refer to EV. An EV can include a battery electric vehicle (BEV), hybrid electric vehicle (HEV), plug-in hybrid electric vehicle (PHEV) and any transportable device that generates or consumes electricity and benefits from autonomous charging. For example, an EV can be a golf-cart, a fork-lift or an electric shopping-cart. Autonomous means that the act of charging the EV or sharing the EV power with the power grid occurs with little or no user action. In so doing, the limitations of frequent and long charging intervals associated with EVs, relative to fossil fuel vehicles disappears thereby facilitating the widespread adoption of EVs.

In one embodiment a user parks an EV at a work site and leaves the EV. In another embodiment the EV is parked at home and the user goes to sleep. A robotic charger detects the presence of the vehicle. Account data associated with the EV either contained in a key, on a receptacle on the EV or both are transmitted wirelessly to a resource that validates whether the grid should charge the car, whether the car should charge the grid and manages billing information. The charger connects to the EV using machine vision and charging proceeds until the user returns to the car, a full charge occurs or some other event terminates the charging process. At this time the charger undocks and stows away awaiting the next EV.

Figure 1:
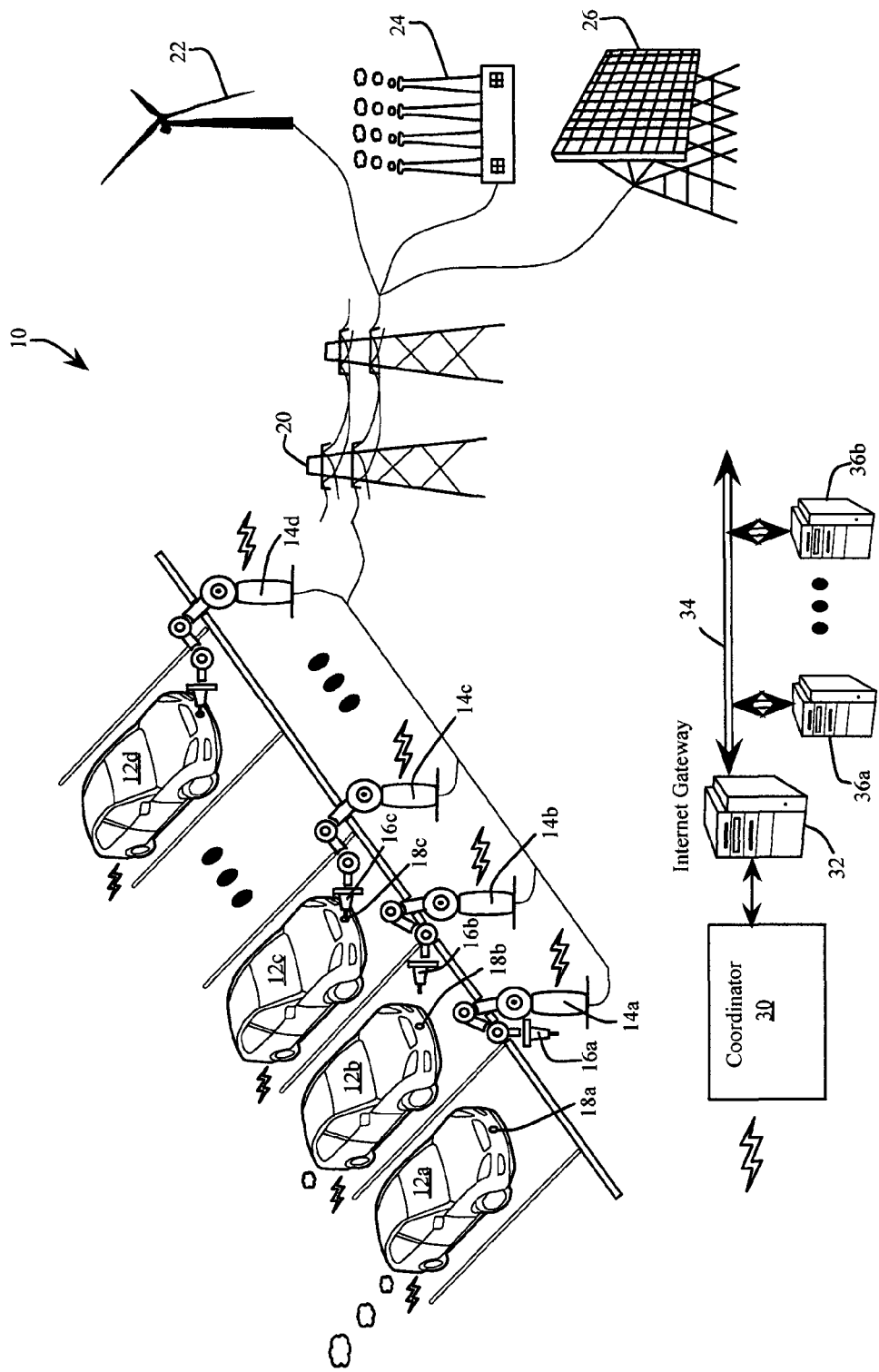
FIG. 1 is a perspective view of an embodiment of a system for charging electric vehicles according to the invention.

FIG. 1 illustrates an embodiment of a charging system 10 for four EVs 12a, 12b, 12c and 12d (generally 12) each having a corresponding receptacle 18a, 18b, 18c and 18d (generally 18) respectively. In one embodiment each EV 12 has more than one receptacle to facilitate coupling to the charger. Each EV 12 is shown at various stages of docking with chargers 14a, 14b, 14c and 14d (generally 14). Each charger 14 has a corresponding docking interface 16a, 16b, 16c and 16d (generally 16) used to couple with the corresponding receptacle 18 on the EV 12.

Each EV 12 and each charger 14 communicates wirelessly with a coordinator 30. The coordinator 30 communicates through an Internet 34 by way of an Internet gateway 32. The Internet connects to a plurality of resources including computers 36a and 36b (generally 36). The Internet 34 may also be a cloud-computing environment where a large number of resources, for example computers, are in communication with the Internet gateway 32. The Internet gateway 32 is preferably a ruggedized tablet personal computer (PC) but may also be any computing device capable of passing low data rate files between the coordinator 30 and the Internet 34.

The wireless communication preferably uses the Institute of Electrical and Electronic Engineers (IEEE) 802.15.4 standard (Zigbee™). Zigbee™ is optimal for control and sensor networks that have low data rate, low power consumption and small packet sizes. Other wireless protocols may be used in place of, or in combination with, Zigbee™ including but not limited to MiWi™, ANT™, IEEE 802.15.1 (Bluetooth®), IEEE 802.11 (WiFi™), IEEE 802.16 (WiMax™), and Long Term Evolution (LTE™).

Each charger 14 also communicates with a power grid 20, which connects to numerous electric power sources, for example a wind turbine 22, a coal burning power plant 24 or an array of solar cells 26. Preferably the chargers 14 support either Level-1 (e.g. single phase 120V), Level-2 (e.g. single phase 230/240V) or any Level-3 (e.g. three phase) power standard, although the chargers 14 are envisioned to be usable with any power line standard available including different frequencies such as 50 Hz and 60 Hz.

The charging system 10 of FIG. 1 illustrates the various stages of docking or coupling a receptacle 18 on an EV 12 with a docking interface 16 on a charger 14. EV 12a has just arrived at a parking spot. Charger 14a senses the proximity of EV 12a when a wireless signal transmitted from EV 12a is strong enough to be detected by charger 14a and determined to be of sufficient magnitude. The charger 14a also ensures that the EV 12a is stationary before attempting to dock. Charger 14a may also use auto-ranging techniques including sonar or measuring the acoustic delay of a signal transmitted by the charger 14a, reflected by the EV 12a and returned to the charger 14a. In other embodiments the auto-ranging may measure the delay of a light beam or sense the magnetic field distortion when a magnetic field emitted by the charger 14a is proximate to metal contained in the EV 12a.

In addition to sensing proximity of the EV 12a to the charger 14a, the roll angle of the EV 12a is transmitted to the charger 14a to facilitate subsequent docking of the docking interface 16a to the receptacle 18a. The roll angle of the EV 12a is measure of how much the EV 12a leans left or right, for example when the EV 12a is parked on a sloped surface. The EV 12a also transmits other charging behavior data, for example the date when the EV 12a was charged, the time and duration when the EV12a was charged and the location where the EV12a was charged. The EV12a also transmits information for billing purposes such as billing address and account data in a secure encrypted format. In one embodiment, the encryption format is a 128-bit encryption based on the National Institute of Standards and Technology (NIST) Certified Advanced Encryption Standard (AES). Information transmitted by the EV 12a is received by the coordinator 30 and passed to the Internet gateway 32 for account validation and billing purposes or to determine if the EV 12a should supply power to the power grid 20 based on the charging behavior of the EV 12a. For example, if the EV12a has excess charge or is expected to remain parked for a long time based on previous charging sessions the EV 12a could supply power to the power grid 20 when there is high demand for power from other EVs connected to the power grid 20. The account corresponding to the EV 12a is credited at a favorable billing rate compared to the billing rate used when the EV 12a previously received power from the power grid 20. In another embodiment the information transmitted by the EV 12a to the coordinator 30 is used to assess a parking fee for the EV 12a. In yet another embodiment the EV 12a can alert the driver of the EV of a potential theft of the EV by sending a signal to the Internet 34 when the EV is moved.

Supplying power from the EV 12 to the power grid 20 is compatible with vehicle to grid (V2G). V2G reduces the demand on power sources 22, 24 and 26 because a large pool of EVs 12 can supplement the power generation of the power sources 22, 24 and 26. The autonomous nature of the charging system 10 improves V2G because an accurate determination of when, where and how to transfer power from an EV 12 to the power grid 20 requires a charging behavior usage database that contains a significant number of charging sessions. This in turn necessitates a system as described with charging system 10 that is easy to use and collects the necessary data for effective V2G without user intervention or manual error.

EV 12b is at the next stage of docking compared to EV 12a. The docking interface 16b on charger 14b is aligned to the receptacle 18b on EV 12b by positioning the docking interface with a robotic arm on the charger 14b. The robotic arm is capable of articulated movement with six degrees of freedom (sixDOF) and a telescoping arm. Robotic arms with additional degrees of freedom are also envisioned. While preferably a sixDOF robotic arm is used, certain installations may advantageously use a robotic arm with more joints to clear obstacles between the charger 14b and the EV 12b.

EV 12c is at the next stage of docking compared to EV 12b. After the initial alignment stage illustrated with EV 12b, and when the docking interface 16c is within close proximity to the receptacle 18c, the docking interface 16c is coupled to receptacle 18c. During the coupling, the alignment of docking interface 18c to the receptacle 18c is maintained until coupling is complete. The proximity of docking interface 16c to the receptacle 18c is sufficiently close when less than a predetermined distance that is defined by a value stored in the charger 14c.

Determining the proximity of the docking interface 16c to the receptacle 18c is based on methods similar to the initial determination that EV 12a was sufficiently close to charger 14a. Specifically, the charger 14c may use auto-ranging techniques including sonar or measuring the acoustic delay of a signal transmitted by the charger 14c, reflected by the EV 12c and returned to the charger 14c. In other embodiments the auto-ranging may measure the delay of a light beam or sense the magnetic field distortion when a magnetic field emitted by charger 14c is proximate to metal contained in EV 12c.

In one embodiment, coupling of the receptacle 18c with the docking interface 16c includes achieving a physical connection between electrodes on the receptacle 18c and electrodes on the docking interface 16c. In another embodiment, the receptacle 18c couples to the docking interface 16c with a magnetic field with power transferred through near-field inductive coupling. In yet another embodiment, the receptacle 18c couples to the docking interface 16c with an optocoupler. Once the receptacle 18c is coupled to the docking interface 16c, the charger 14c performs supplies power from the power grid 20 to the EV 12c, supplies power from the EV 12c to the power grid 20, or both. In one embodiment, the charger 14c contains a current limit device to lower the charging rate with a corresponding reduction in billing charges.

EV 12d is at the next stage of docking compared to EV 12c. The EV 12d is charged by charger 14d. The EV 12d signals the end of a charging session expressly or as a fail-safe when the EV 12d begins to move. The charger 14d then stores the robotic arm as depicted with charger 14a.

In addition to charging the EV 12 or returning power to the power grid 20 with V2G, the charging system 10 also enables a user to control a device of the EV 12 by sending a control signal through the Internet 34 to the coordinator 30 to be communicated to the EV 12. In one embodiment the control signal received by the EV 12 controls the EV 12 air conditioning, heating and lighting systems by further communicating with the EV 12 controller area network (CAN) or local interconnect network (LIN) bus. A CAN or LIN bus provides communication between a variety of devices in an EV such as heating systems, lighting and radios. The control signal received by the EV 12 is beneficial to start a car to warm the cabin before a driver arrives or to activate lights to locate a car in a crowded lot for example.

Figure 2:
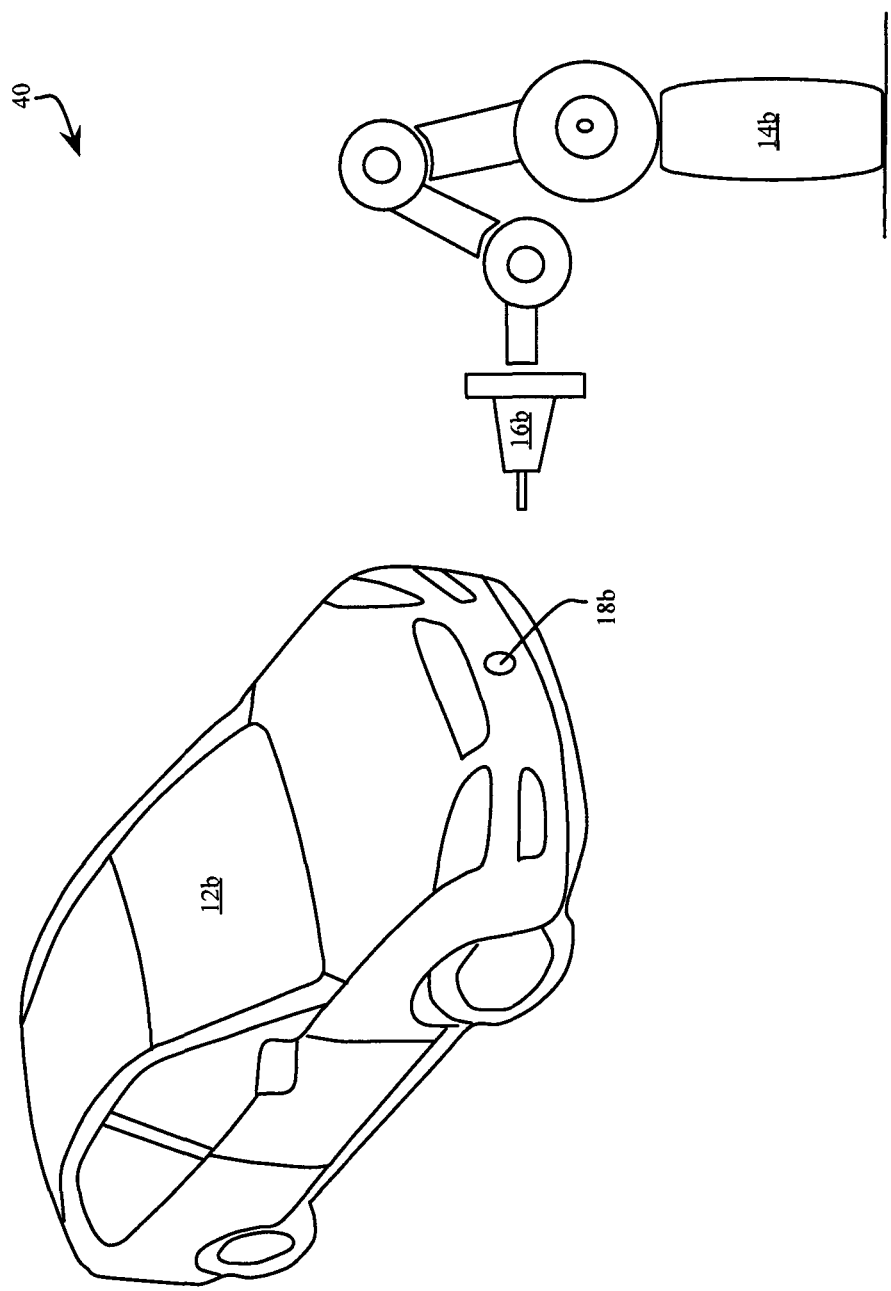
FIG. 2 is a perspective view of an electric vehicle and a charger illustrated in FIG. 1.

FIG. 2 further illustrates the docking interface 16b on charger 14b aligning to the receptacle 18b on EV 12b as shown in FIG. 1. In one embodiment the receptacle 18b is on the front of the EV 12b. In other embodiments, the receptacle 18b is on the rear or on the side of the EV 12b. In yet another embodiment, multiple receptacles are available for the charger 14b to choose from based on proximity.

FIG. 3A shows an embodiment of a docking interface 52 with a plurality of electrical connectors 56, an electromagnetic surface 60 and an imager 64. The surface 60 is magnetized by an electromagnet that is powered by the charger 14 when docking the charger 14 to the EV 12. After charging is complete, the electromagnet is deactivated thereby facilitating the undocking of the charger 14 to the EV 12. The electrical connectors 56 include a combination of power, ground and signals. In one embodiment the imager 64 is responsive to infrared light and contains a field of view sufficient to see the receptacle 16 during docking as illustrated in FIG. 1.

FIG. 3B shows an embodiment of a receptacle 54 with a plurality of electrical receptors 58, a magnetized surface 62, a west feature 66, a north feature 68, an east feature 70 and a centroid feature 72 mounted on a pedestal 74. In one embodiment the length of the pedestal 74 is approximately the same as the distance between the west feature 66 and the east feature 70, which is 74 mm in one instance. The docking interface 52 shown in FIG. 3A is a female connector and the receptacle 54 shown in FIG. 3B is a male connector. It is contemplated that the docking interface 52 may be a male connector and the receptacle 54 a female connector, or the docking interface 52 may be a female connector and the receptacle 54 a male connector. The electrical connectors 56 and the electrical receptors 58 are designed to couple with a friction fit however they may also be capacitively coupled or inductively coupled to further isolate the EV 12 from high voltages for safety reasons. In one alternative embodiment the surface 62 on the receptacle 54 is an unmagnetized metallic surface. In another embodiment the surface 62 is an electromagnet powered by the EV 12 when docking the charger 14 to the EV 12 and the surface 60 on the docking interface 52 is either metallic, a permanent magnet or an electromagnet.

Features 66, 68, 70 and 72 may be reflective emblems illuminated by a light source in the docking interface 52, or may be light emitting diodes (LEDs) or a light pipe formed by a fiber optic thread illuminated by a light source. In one embodiment the LEDs are preferably infrared LEDs with a 7.5 Hz square-wave amplitude modulation. The LED frequency and modulation scheme is preferably chosen to be responsive to emissions from the receptacle features and not responsive to ambient light or heat sources that may interfere with the receptacle emissions. In another embodiment additional features are present to provide redundancy in case a feature is obscured or to achieve increased accuracy.

In one embodiment, the imager 64 of the docking interface 52 has a wiper mechanism to keep the imager 64 free of dirt and snow. Alternatively, the imager 64 of the docking interface 52 has an iris shutter to keep the imager 64 free of dirt and snow. In another embodiment, the imager 64 of the docking interface 52 has forced hot air blown across it through one of the electrical connectors 56. A heater and blower on the charger 14 provides a flow of heated air through a tube from the charger 14 to one of the connectors 56. In another embodiment, the imager 64 is heated with a thermostatic heater. Specifically, the spring 76 in FIG. 3C is heated and heat is conductively transferred to the imager 64.

Figure 3C:
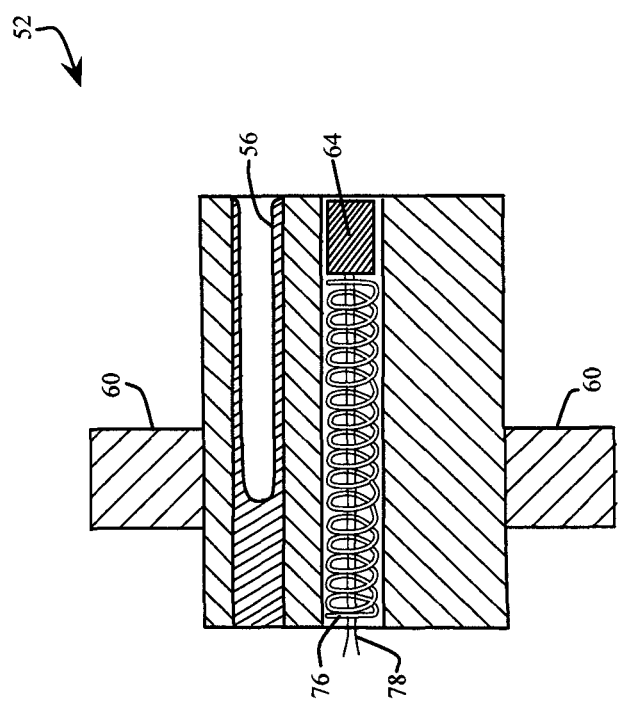
FIG. 3C is a cross-sectional view of FIG. 3A taken along A-A', further illustrating a spring-loaded imager and an electromagnet.

FIG. 3C shows the cross-section of FIG. 3A taken along A-A' and illustrates the electrical connector 56 with a friction fit adapted to receive an electrical receptor 58 on the receptacle 54. The imager 64 is spring-loaded by a spring 76 and communicates with the charger 14 of FIG. 1 with signals 78. The spring 76 is a low compression force spring allowing the pedestal 74 of receptacle 54 to compress the spring 76 during the docking process. Docking interface 52 has an electromagnetic surface 60. The polarization of the surface 60 can be removed or reversed after charging of the EV 12 or transferring power to the power grid 20 is complete.

FIG. 4A shows a modification of the embodiment of the docking interface 82 shown in FIG. 3A, where the imager 64 is contained in a threaded hole 88. FIG. 4B shows a modification of the embodiment of the receptacle shown in FIG. 4B where the pedestal contains threads 86 adapted to couple with the threaded hole 88 shown in FIG. 3A.

Figure 4C:
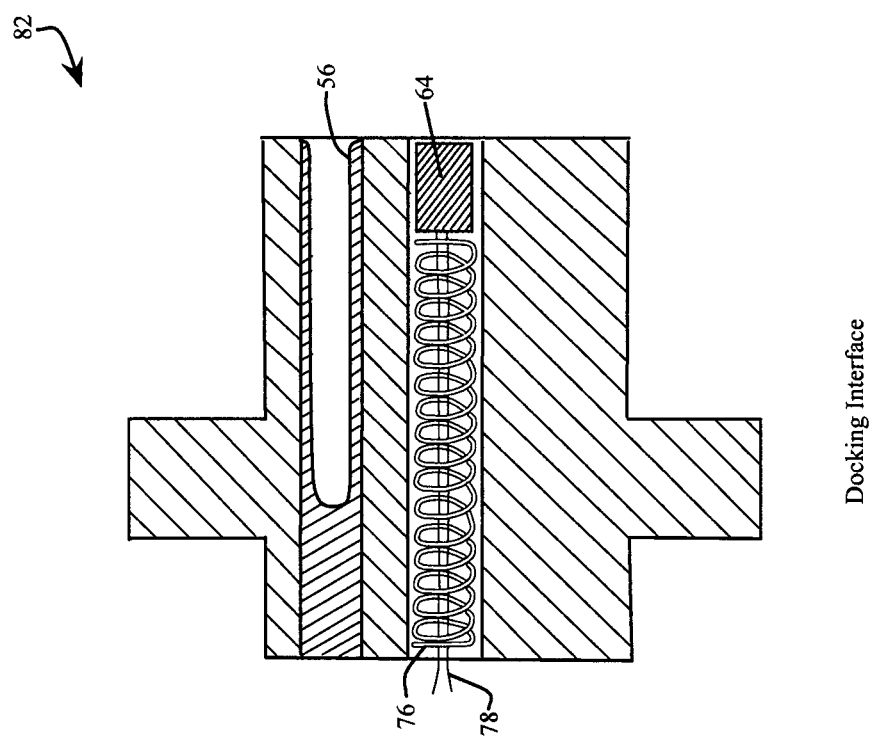
FIG. 4C is a cross-sectional view of FIG. 4A taken along B-B', further illustrating the spring-loaded imager.

FIG. 4C shows the cross-section of FIG. 4A taken along B-B'. FIG. 4C is similar to FIG. 3C with the exception that the electromagnetic surface 60 in FIG. 3C is absent. The docking interface shown in cross-section in FIG. 4C uses a threaded screw or auger formed by the threaded pedestal 86 on receptacle 84 to couple to the threaded hole 88 of docking interface 82. In one embodiment, the threaded pedestal 86 is powered by the receptacle 84 to rotate during the docking session and to stop rotating when the docking interface 82 and the receptacle 84 are coupled, determined by conduction between one of the electrical connectors 56 and one of the electrical receptors 58.

FIG. 5 is a modification to the docking interface 82 shown in FIG. 4A where the imager 64 is offset from the centroid feature 72 shown in FIG. 4B. Advantageously, this embodiment does not require the spring 76 shown in FIG. 3C but requires accurate ranging information to establish the distance between the docking interface 82 and receptacle 84 during docking, and the distance between the threaded hold 88 and the imager 64 to compensate for the imager 64 offset during alignment of the docking interface 82 and the receptacle 84.

Figure 6:
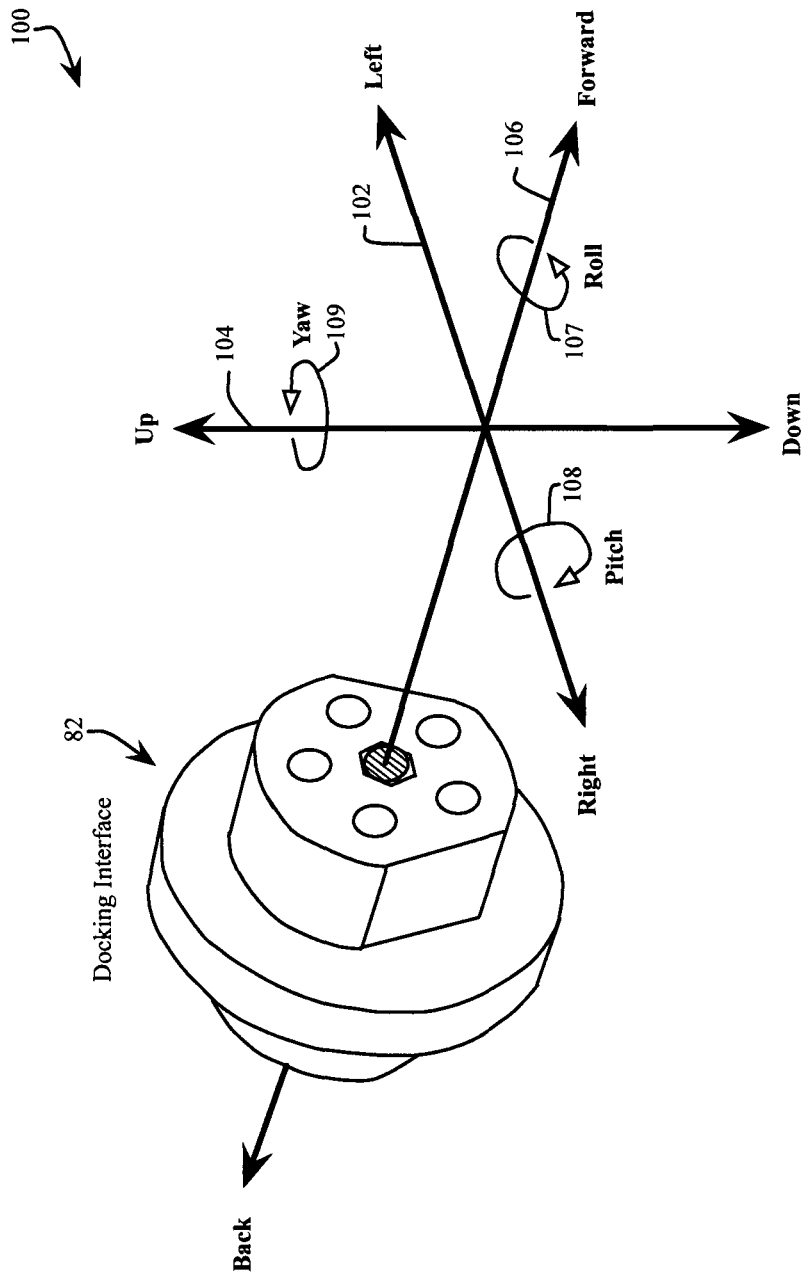
FIG. 6 is a perspective view of the embodiment of the docking interface in FIG. 4A in relation to three axis defining the six degrees of freedom.

FIG. 6 shows an embodiment of the docking interface 82 of FIG. 4A in relation to the three axis defining the six degrees of freedom (sixDOF). To properly align the docking interface 82 with the receptacle 84 shown in FIG. 4A and FIG. 4B respectively the docking interface 82 is aligned to the receptacle 84 in six ways. First, the docking interface 82 achieves coaxial alignment by correcting for horizontal misalignment on axis 102 and vertical misalignment on axis 104. Second, the docking interface 82 reduces proximity to the receptacle 84 by moving along axis 106. Third, the docking interface 82 achieves roll 107 alignment. Fourth, the docking interface 82 achieves pitch 108 alignment. Fifth, the docking interface 82 achieves yaw 109 alignment. Each of the sixDOF may be interdependent and require concurrent alignment or each of the sixDOF may be adjusted iteratively.

FIGS. 7A, 7B and 7C illustrate a method of coaxially aligning the docking interface 82 of FIG. 4A to the receptacle 84 of FIG. 4B. In FIG. 7A, the imager 64 shown in FIG. 4A sees four features: the centroid feature 72, the west feature 66, the north feature 68 and the east feature 70. In FIG. 7A, the docking interface 82 is north-west of the receptacle 84 and should be moved to the right and downward to maintain an equal distance between the centroid feature 72 and each of the west feature 66, the north feature 68 and the east feature 70. In FIG. 7B, the docking interface 82 is east of the receptacle 84 and should be moved to the right to maintain an equal distance between the centroid feature 72 and each of the west feature 66, the north feature 68 and the east feature 70. In FIG. 7C, the docking interface 82 has achieved coaxial alignment with the receptacle 84.

Figures 8A, 8B:
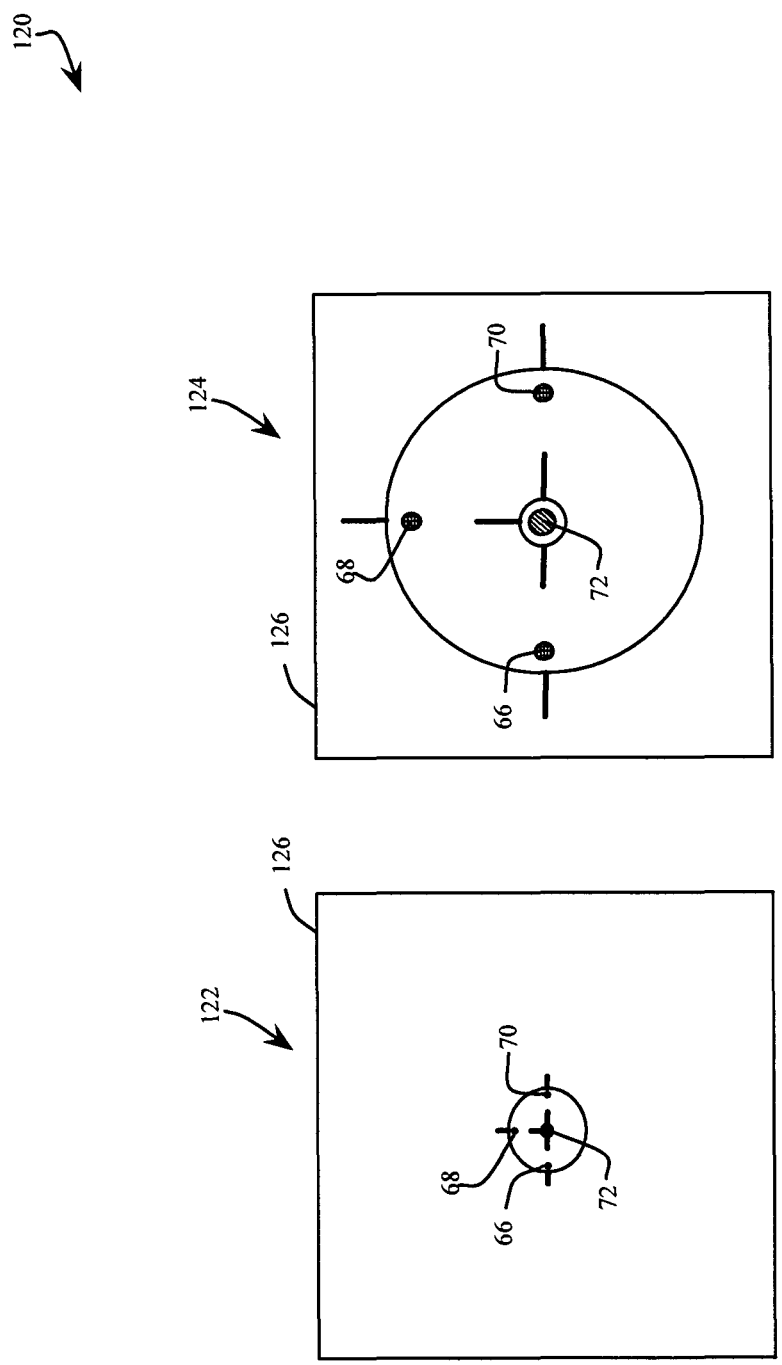
FIGS. 8A and 8B illustrate the proximity of a receptacle in the field of view.

FIGS. 8A and 8B illustrate a method of achieving proximity of the docking interface 82 of FIG. 4A to the receptacle 84 of FIG. 4B to within a predetermined distance. In FIG. 8A, the receptacle 84 is far from the docking interface 82 relative to the receptacle 84 shown in FIG. 8B because the distance between the west feature 66 and the east feature 70 is small in comparison to the field of view 126 of the imager 64 shown in FIG. 4A. By increasing the distance between the west feature 66 and the east feature 70, the docking interface 82 is positioned closer to the receptacle 84 as shown in FIG. 8B.

While preferably the west feature 66 and the east feature 70 are used to achieve proximity, maximizing the distance between any two features on the receptacle 84 similarly results in positioning the docking interface 82 closer to the receptacle 84. For example, maximizing the distance between the centroid feature 72 and the west feature 66 ultimately results in moving the docking interface 82 closer to the receptacle 84 even though a concurrently performed coaxial alignment shown in FIGS. 7B and 7C may temporarily interfere with the proximity adjustment, until coaxial alignment is achieved.

Figures 9A, 9B:
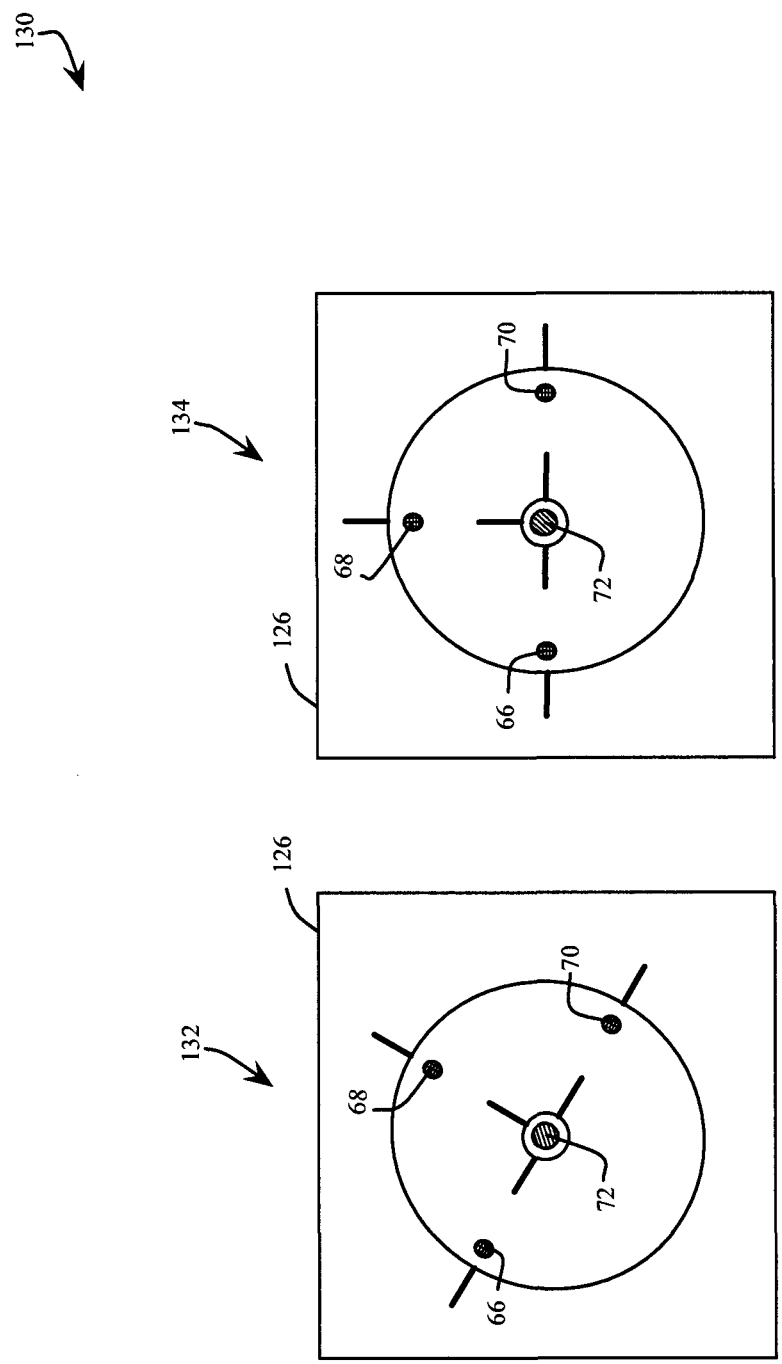
FIGS. 9A and 9B illustrate the roll alignment using features on a receptacle.

FIGS. 9A and 9B illustrate a method of achieving roll alignment of the docking interface 82 of FIG. 4A to the receptacle 84 of FIG. 4B. Specifically, FIG. 9A shows the features on a receptacle 84 rolled about the axis 106 shown in FIG. 6, while FIG. 9B shows the same features on a receptacle 84 after roll alignment is achieved. Preferably an alignment line intersecting the west feature 66 and the east feature 70 is compared with a reference line stored in the charger 14a of FIG. 1. The reference line stored in the charger 14a is modified by the roll angle of the EV 12a to compensate for sloped parking surfaces.

While preferably the west feature 66 and the east feature 70 are used to form the alignment line used for roll alignment, it is contemplated that the alignment line can intersect any two features. Similar to the interaction of concurrently performing coaxial alignment and achieving proximity, the use of the centroid feature 72 and the west feature 66, (or similarly the east feature 70), may cause an interaction between roll alignment and coaxial alignment but ultimately both roll alignment and coaxial alignment are achieved.

Figures 10A, 10B:
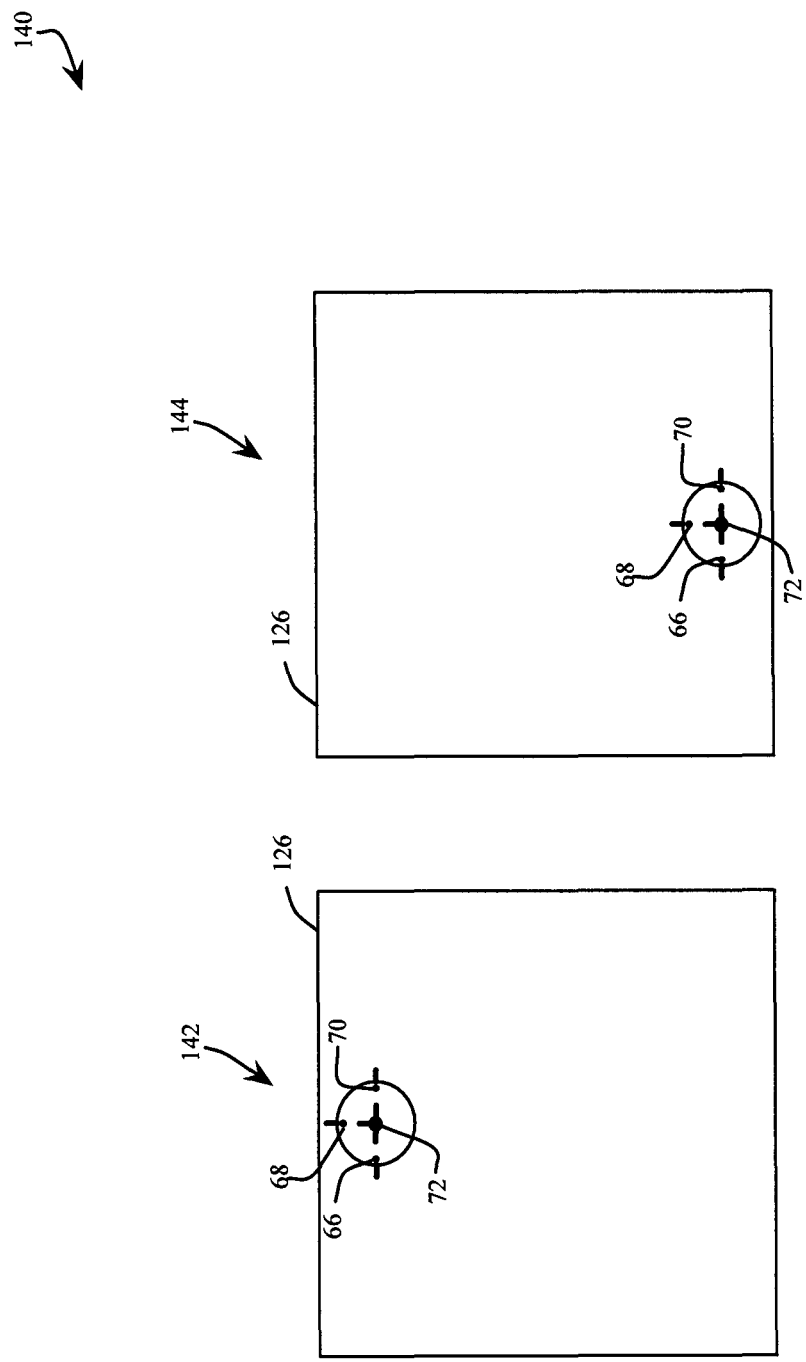
FIGS. 10A and 10B illustrate the pitch alignment of a receptacle in the field of view.

FIGS. 10A and 10B illustrate a method of achieving pitch alignment of the docking interface 82 of FIG. 4A to the receptacle 84 of FIG. 4B. FIG. 10A shows the features of the receptacle 84 shifted to the top of the field of view 126 of the imager 64. Pitch alignment is achieved by moving the centroid feature 72 downward to the center of the field of view 126. FIG. 10B shows the features of the receptacle 84 shifted to the bottom of the field of view 126 of the imager 64. Pitch alignment is achieved by moving the centroid feature 72 upward to the center of the field of view 126.

FIGS. 10C and 10D illustrate a method of achieving yaw alignment of the docking interface 82 of FIG. 4A to the receptacle 84 of FIG. 4B. FIG. 10C shows the features of the receptacle 84 shifted to the left of the field of view 126 of the imager 64. Yaw alignment is achieved by moving the centroid feature 72 rightward to the center of the field of view 126. FIG. 10B shows the features of the receptacle 84 shifted to the right of the field of view 126 of the imager 64. Yaw alignment is achieved by moving the centroid feature 72 leftward to the center of the field of view 126.

Figure 10E:
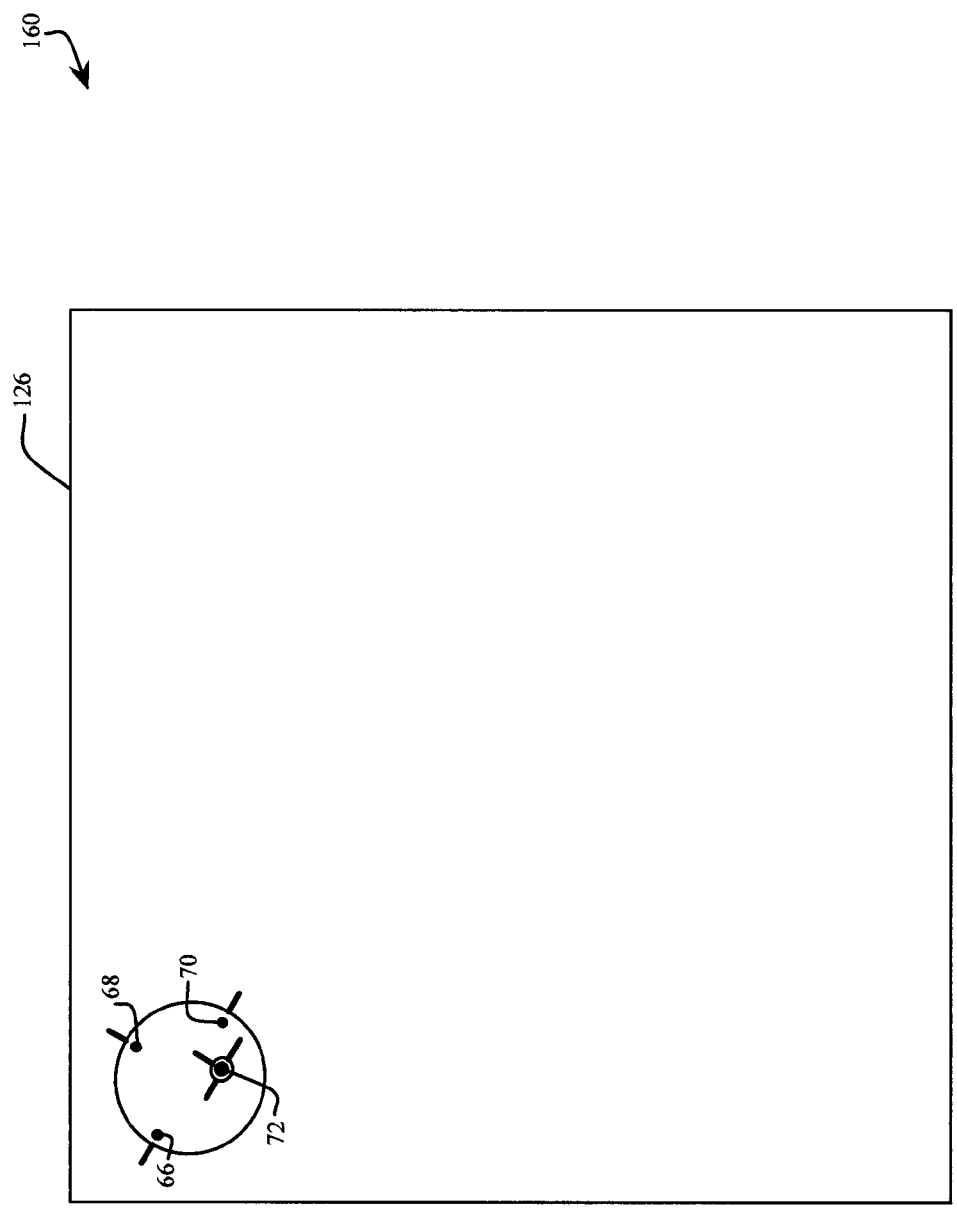
FIG. 10E illustrates a receptacle with coaxial misalignment, roll misalignment, pitch misalignment and yaw misalignment.

FIG. 10E shows the features of a receptacle 84 with coaxial misalignment, proximity less than a predetermined distance, roll misalignment, pitch misalignment and yaw misalignment. Each of the sixDOF alignments shown in FIG. 6 can be adjusted concurrently with one or more of the other sixDOF alignments, or each of the sixDOF alignments can be adjusted independently and iteratively. In one embodiment, an initial pitch alignment and a yaw alignment occur first to move the features on the receptacle 84 to the center of the field of view 126. This advantageously improves the accuracy of subsequent alignment steps by using the center of the field of view 126 of the imager 64, where less lens distortion and parallax occurs.

The field of view 126 is designed to cover sufficient area to initially see the features of the receptacle 84. In other embodiments, the imager 64 includes a zoom feature to create a wider field of view 126 to facilitate initial image capture. In another embodiment, the charger 14 of FIG. 1 performs a raster scan movement to facilitate initial image capture. The raster scan movement begins at the top left of the field of travel of the charger 14, moves from left to right, moves downward by less than the height of the field of view 126, scans right to left, moves downward by less than the height of the field of view 126 and repeats the above steps.

Figure 11:
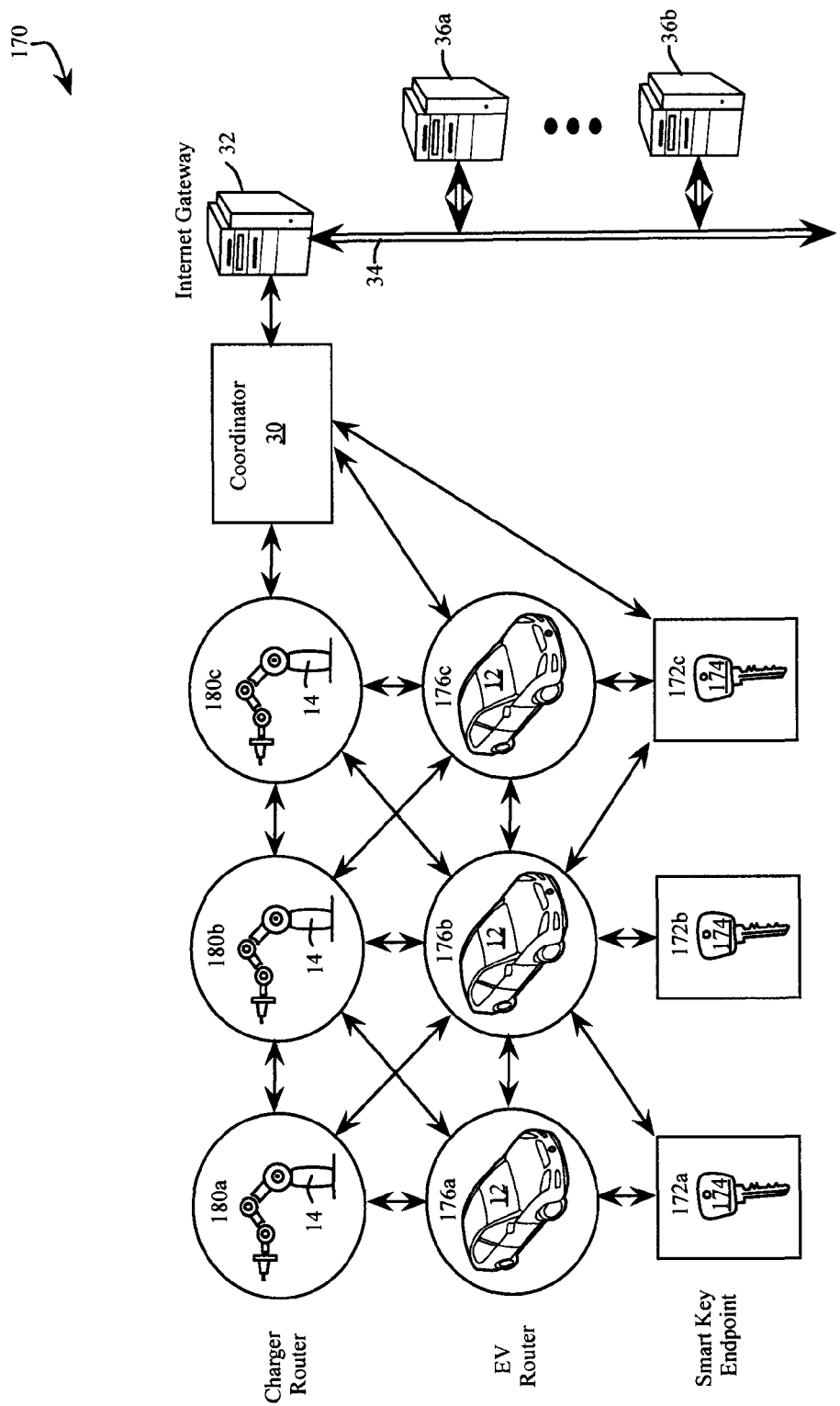
FIG. 11 is a schematic view of an embodiment of a mesh network according to the invention.

FIG. 11 illustrates a mesh network 170 used for simple, scalable and fault tolerant communication between components of a charging system described herein. FIG. 11 shows three EVs 12, each with a smart key 174 and a charger 14. Each charger 14 and each EV 12 is capable of being a wireless router, which means it can retransmit information at the request of other components. Each smart key 174 is a wireless end-point, which means it can respond to a request, but does not retransmit information on behalf of other components, thereby extending the battery life of the smart key 174. A smart key 174 can be a single integrated component or can be a separate module carried on a key chain.

The mesh network 170 includes three chargers 14 acting as charger routers 180, 180b and 180c (generally 180), three EVs 12 acting as EV routers 176a, 176b and 176c (generally 176) and three smart keys 174 acting as smart key endpoints 172a, 172b and 172c (generally 172). Each charger router 180 can retransmit data from any other charger router 180, any other EV router 176 and the coordinator 30. Each EV router 176 can retransmit data from any other EV router 176, any charger router 180, any smart key endpoint 172 and the coordinator 30. Each smart key endpoint 172 cannot retransmit data but can respond to a request from any EV router 176 or the coordinator 30. For readability, the coordinator 30 in FIGS. 11, 12, 13A and 13B is shown communicating with only one charger router 180c, one EV router 176c and one smart key endpoint 172c however the coordinator 30 communicates directly with all charger routers 180, all EV routers 176 and all smart key endpoints 172.

Communication between each of the routers and endpoints in the mesh network 170 occurs in a daisy-chained fashion. For example the smart key endpoint 172a can communicate with the charger 180a through the EV router 176a or though the EV router 176b. The mesh network 170 is tolerant of high latencies and low data rates between routers and endpoints. The inherent redundancy of the mesh provides for fault tolerant operation and scalability. Additional chargers 14 can easily be added or chargers 14 taken down for maintenance without adversely affecting the other chargers 14.

In one embodiment each EV router 176 is a single receptacle 18 on the EV 12. Accordingly, the receptacle 18 on the front of an EV 12 can be coupled to a charger 14 but a second receptacle on rear or side of the EV 12 can retransmit data from the charger router 180 or the smart key endpoint 172.

The smart key 174 and the smart key endpoint 172 contain data associated with an account holder, typically the driver. The EV 12 or a receptacle 18 thereon contains data associated with the EV 12. The separation of data associated with the account holder and the EV 12 provides for a shared car experience where a parent and a teenage driver can each use the same car with separate keys for billing purposes or to store preferences such as charging behavior. An account holder can also use the smart key 172 in a rental car scenario or a borrowed car scenario for billing and personalization.

When the EV is parked and ready to be charged, the smart key 174 pairs with and activates a receptacle 18 to enable charging. The smart key 174 can then be removed during charging. In one embodiment, the smart key 174 is also the ignition key and automatically enables charging by detecting when the ignition key has been removed from the EV 12.

Upon returning to the car, the driver inserts the ignition key and the smart key 174 is updated with charging information from the charger 14 used to charge the EV 12.

Each of the charger routers 180 monitors the signal strength of other charger routers 180 and EV routers 176, and each of the EV routers 176 monitors the signal strength of other charger routers 180, EV routers 176 and smart key endpoints 172, and transmits the signal strength information to the coordinator 30 directly or through a daisy chained path in the mesh. The coordinator 30 uses the signal strength information to create a routing map of possible communication paths between any of the elements in the mesh. The coordinator 30 also communicates through the Internet 34 with resources including computers 36a and 36b through the Internet gateway 32. In one embodiment, the Internet gateway is a computer configured as a file server. The routing map can be a real time response or it can be stored in a database in communication with the coordinator 30. For example, the routing map can be stored on a computer 36a or 36b. Each of the charger routers 180, EV routers 176 and smart key endpoints 172 becomes aware of the possible communication paths by receiving a beacon from the coordinator 30. The beacon is a packet of data containing the communication paths for each element in the mesh network 170.

Figure 12:
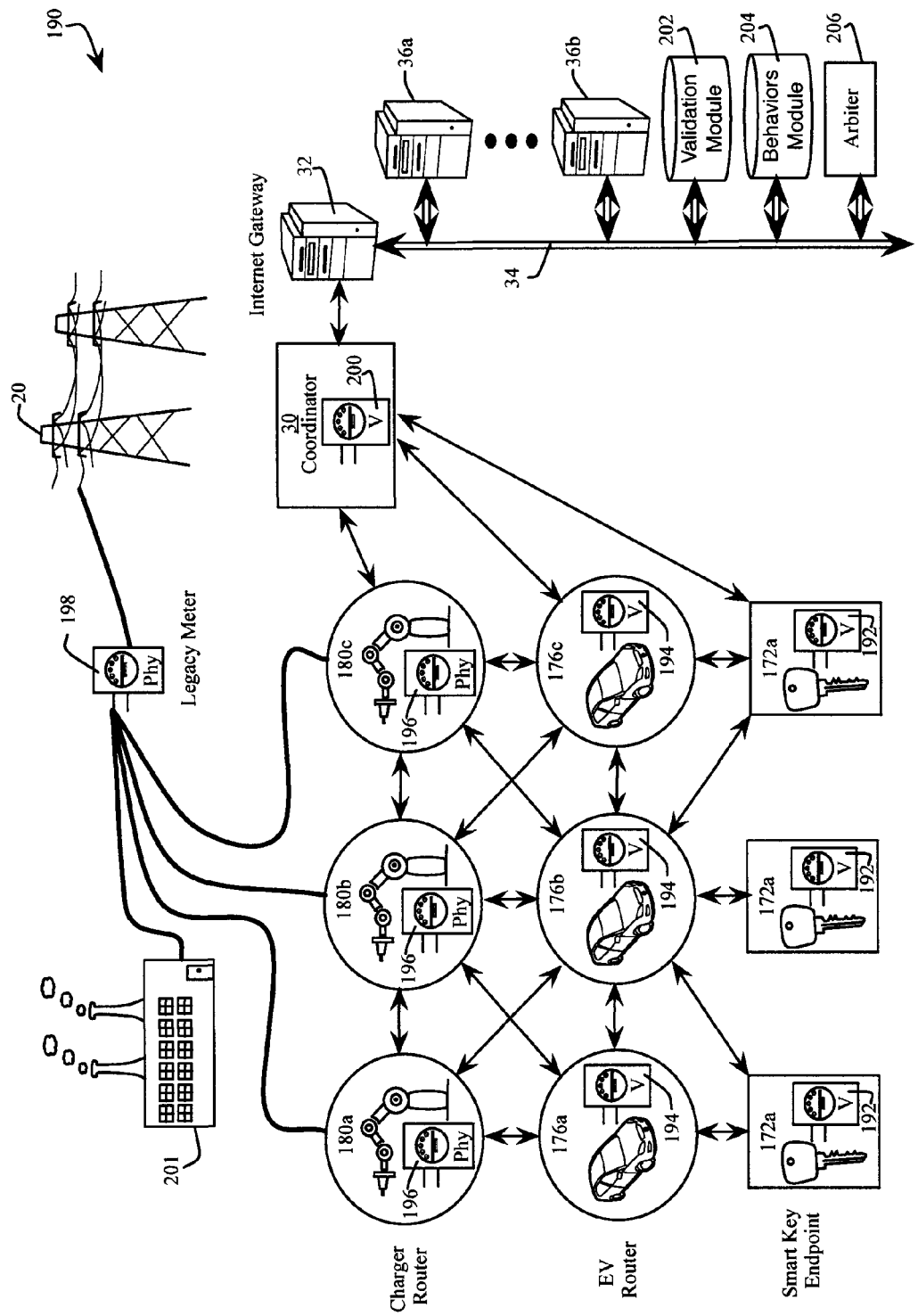
FIG. 12 is a schematic view of an embodiment of a metering architecture according to the invention.

FIG. 12 shows the mesh network 170 of FIG. 11 further including a metering architecture and additional Internet resources. The charging system 10 of FIG. 1 is designed to easily work with an existing power grid 20 infrastructure. Each charger router 180 communicates with a physical power meter 196 and with a physical legacy meter 198. The legacy meter 198 measures all power supplied to or from the power grid 20. Each power meter 196 measures all power supplied to or from the charger 14 including multiple charging sessions with multiple EVs 12.

In one embodiment, upon completion of a charging session with an EV 12 a virtual power meter 200 in communication with the coordinator 30 records the power consumption of the power meter 196, which is transmitted by the charger router 180 and associates the power consumption with the particular EV 12 receiving or supplying power. The coordinator 30 then transmits the power consumed to a virtual meter 194 associated with an EV 12 and to a virtual meter 192 associated with an account holder. The virtual meters 192, 194 and 200 appear as physical meters to the mesh network 190 but store data representing power supplied or power consumed in non-volatile storage. In one example, the non-volatile memory is Flash memory.

The physical meters 196 are read with automatic meter reading (AMR), which is a wireless protocol to transfer the power meter data to the charger router 180. The coordinator 30 monitors and records the aggregate power consumption or transfer from information sent by the power meters 196 to determine the amount of power consumed or transferred to the power grid 20 exclusive of regular premise use outside of the charging system 10, for example an industrial plant 201.

Data collected from each charging session is stored in a behaviors module 204. In one embodiment the behaviors module 204 stores at least one of the date, time and duration when the EV 12 was charged and the location where the EV 12 was charged. The collected data are useful for V2G to determine which EVs 12 can advantageously return power to the power grid 20. The collected data can also facilitate targeted marketing to vehicle owners. In one embodiment, the coordinator 30 uses an arbiter 206 to determine which EV 12 should supply power to the power grid 20 and how it should do so. For example, one EV 12 may provide sufficient power for V2G; however, several EVs 12 can be available to supply the necessary power. In one example, the arbiter chooses an EV 12 that is most likely to remain coupled to the charger 14 during an entire charging session based on past charging behavior recorded in the behaviors module 204.

The coordinator 30 also communicates with a validation module 202, which stores account information required to authorize a charging session. The validation module can also store parking infractions or other data that could prevent the EV 12 from using the charging services.

The validation module 202, behaviors module 204 and the arbiter 206 can each include a single database containing data for all EVs 12 using the charging system 10 or can include multiple databases, for example a database for each EV 12.

Figure 13A:
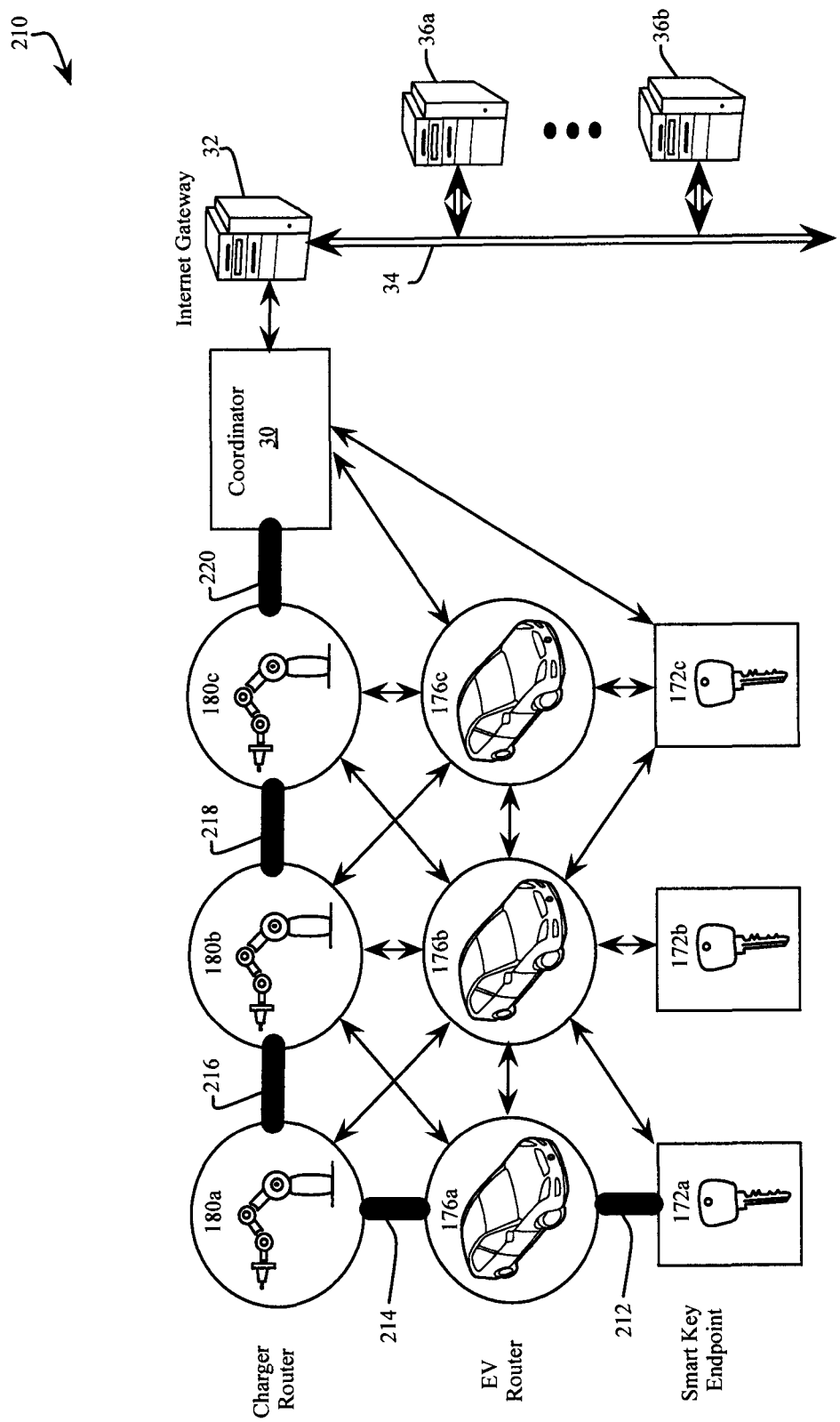
FIG. 13A is a schematic view of the mesh network in FIG. 11 showing a communication path.

FIG. 13A illustrates an example of a communication path as described in FIG. 11. In one embodiment, each of the smart key endpoints 172, EV routers 176 and charger routers 180 receives a beacon from the coordinator 30 defining either preferred or available communication paths. The smart key endpoint 172a and the EV router 176a communicate through a wireless path 212. The EV router 176a and the charger router 180a communicate through a wireless path 214. The charger router 180a and the charger router 180b communicate through a wireless path 216. The charger router 180b and the charger router 180c communicate through a wireless path 218 and the charger router 180c and the coordinator 30 communicate through a wireless path 220. In another embodiment, any of the smart key endpoint 172a, the EV router 176a or any of the charger routers 180 communicates directly with the coordinator 30.

Figure 13B:
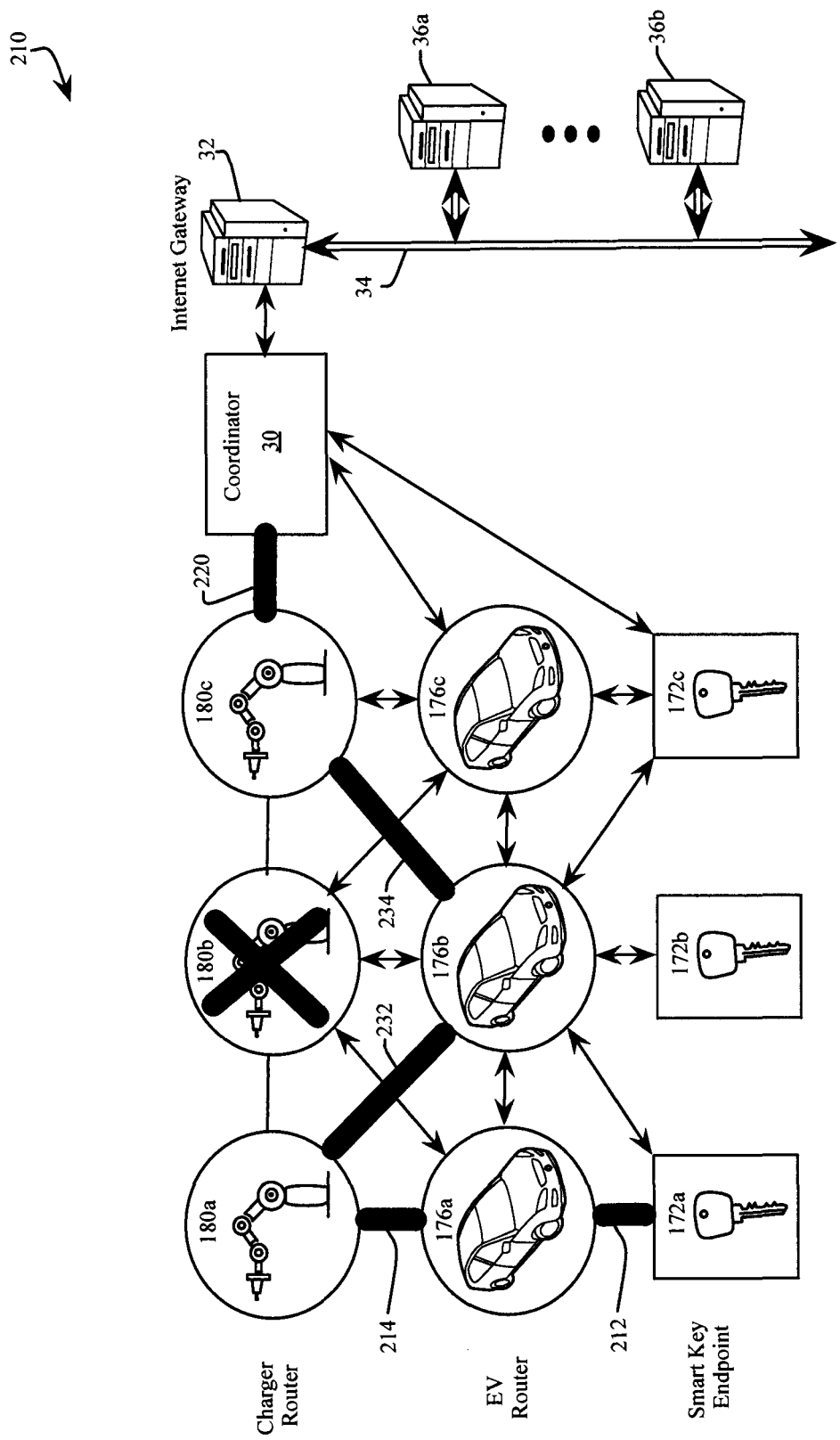
FIG. 13B is a schematic view of the mesh network in FIG. 13A showing a repaired communication path.

FIG. 13B shows the routing mesh network 210 of FIG. 13A to further illustrate how the communication paths are managed. In FIG. 13B the charger router 180b has failed, thereby breaking the daisy chained path used in FIG. 13A. The coordinator receives signal strength information from as least one of charger routers 180a and 180c one of EV routers 176a, 176b or 176c. In one embodiment, the coordinator 30 determines that the next best path from the smart key endpoint 172a to the coordinator 30 based on the loss of signal from charger router 180b and sends a new beacon to all elements in the mesh network 210. The daisy-chained path is then modified to use EV router 176b instead of charger router 180b to complete the path. Accordingly, charger router 180a and EV router 176b communicate through a wireless path 232, and EV router 176b and charger router 180c communicate through a wireless path 234.

Although wireless communication has been described throughout the embodiments and in further detail in FIG. 1, other communication paths are contemplated. For example, one or more wireless path could instead use optical links or other spectral emissions of any frequency. Certain links could also be implemented with wired connections, for example path 220 between the charger router 180c and the coordinator 30.

In another aspect, as shown in the illustrations of FIGS. 14-20, the present inventive concepts feature a system and method for automatic charger resource sharing to support one or more EVs simultaneously on a time-shared basis, also referred to as charger-resource congestion-management.

Applications of the automatic charger resource sharing system and method can relate to dynamic (short duration) parking scenarios, e.g., at a charging location at a parking lot or garage for a retail establishment, a highway rest stop fast-charge location, or static parking scenarios, e.g., over-night residential parking locations, and/or blended parking scenarios, for example, a charging location at a workplace or airport. Features of the charger-resource congestion-management techniques described in accordance with some embodiments are important because they dramatically decrease the costs of EV infrastructure per user, i.e., N chargers need to be installed to support M users; where N and M are integers and where N<<M. This can eliminate the known problem of "charger hogs", for example, at a charging station. In addition to capital-cost reductions, its automated nature will provide for operational cost reductions for fleet servers/operators (i.e. no human labor is required to execute the allocation of the limited resource).

Figure 14A:
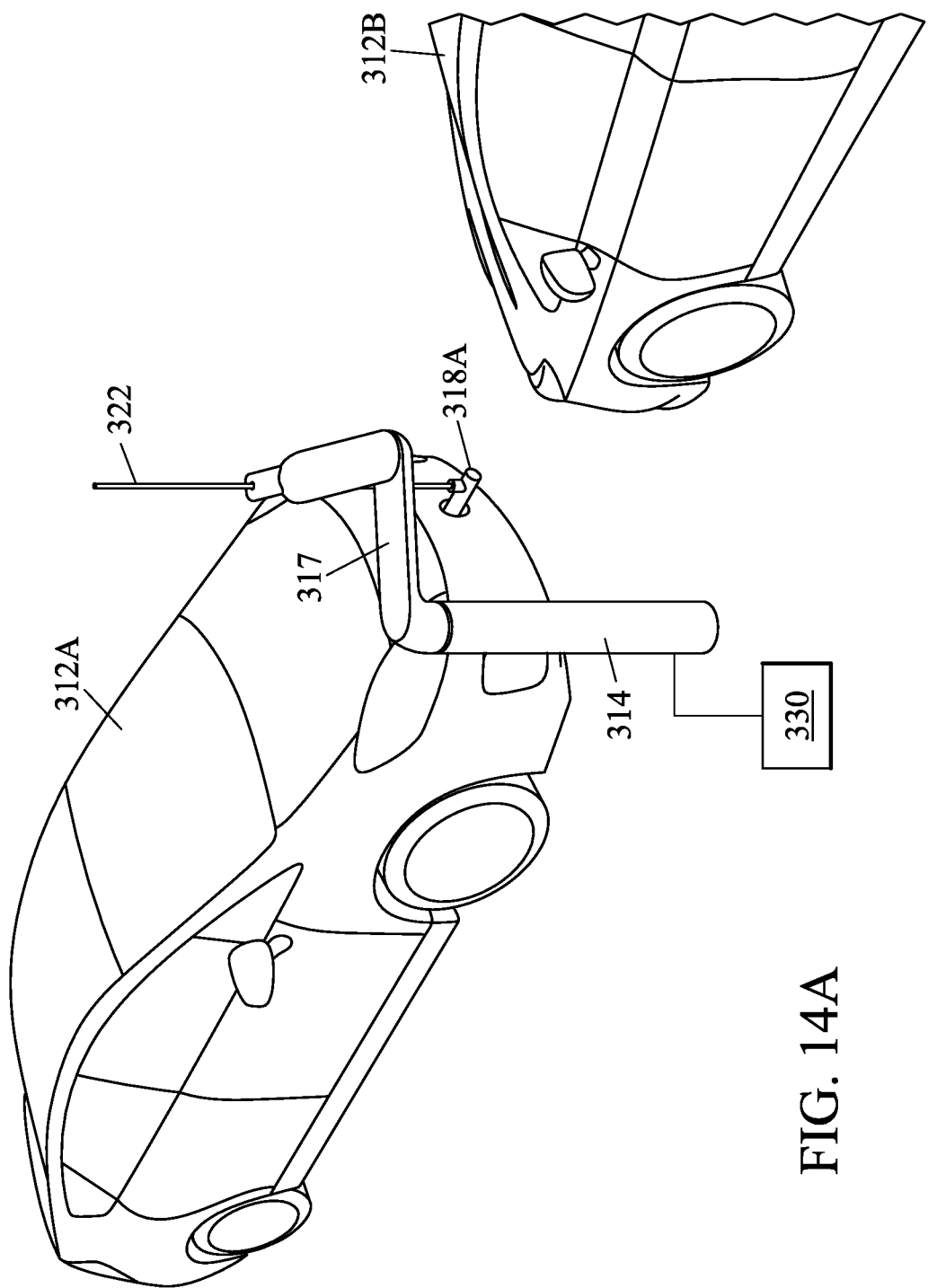
FIG. 14A is an illustrative front view of two electric vehicles proximal to a charger at a parking location, in accordance with an embodiment.
Figure 14B:
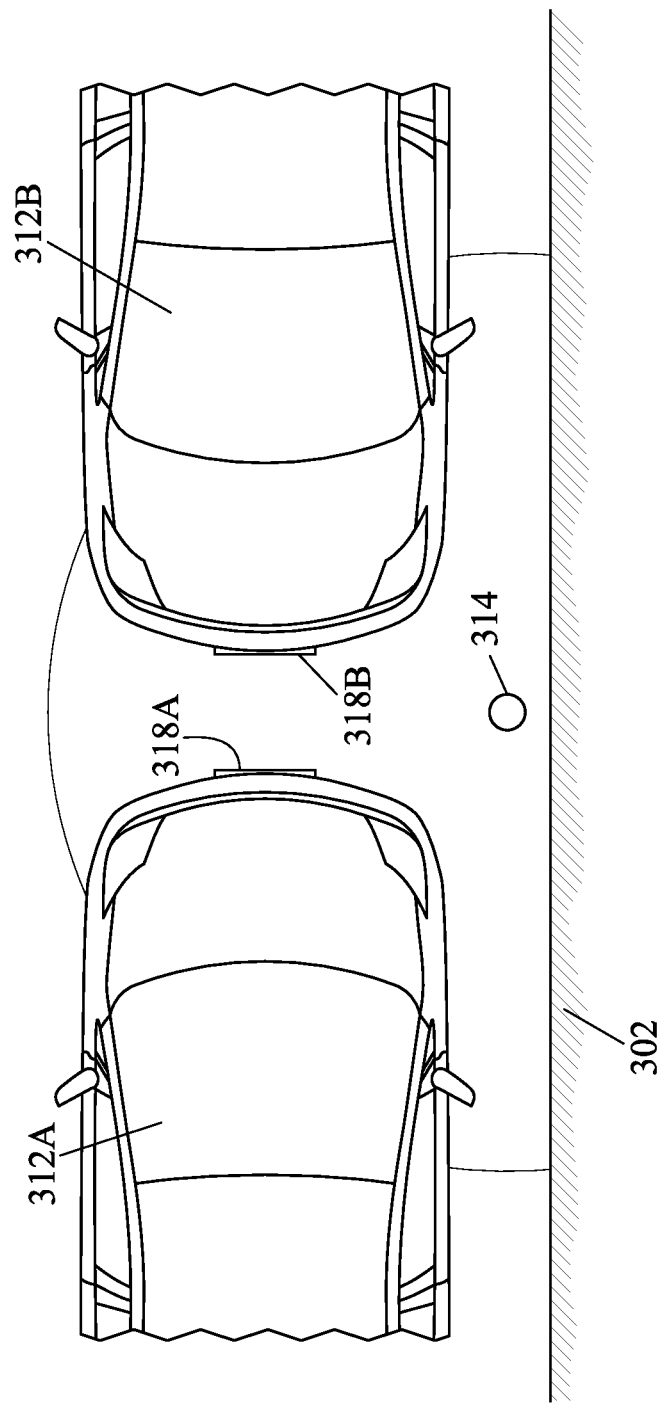
FIG. 14B is a top view of the two electric vehicles proximal to the charger at a parking location shown in FIG. 14A.
Figure 16A:
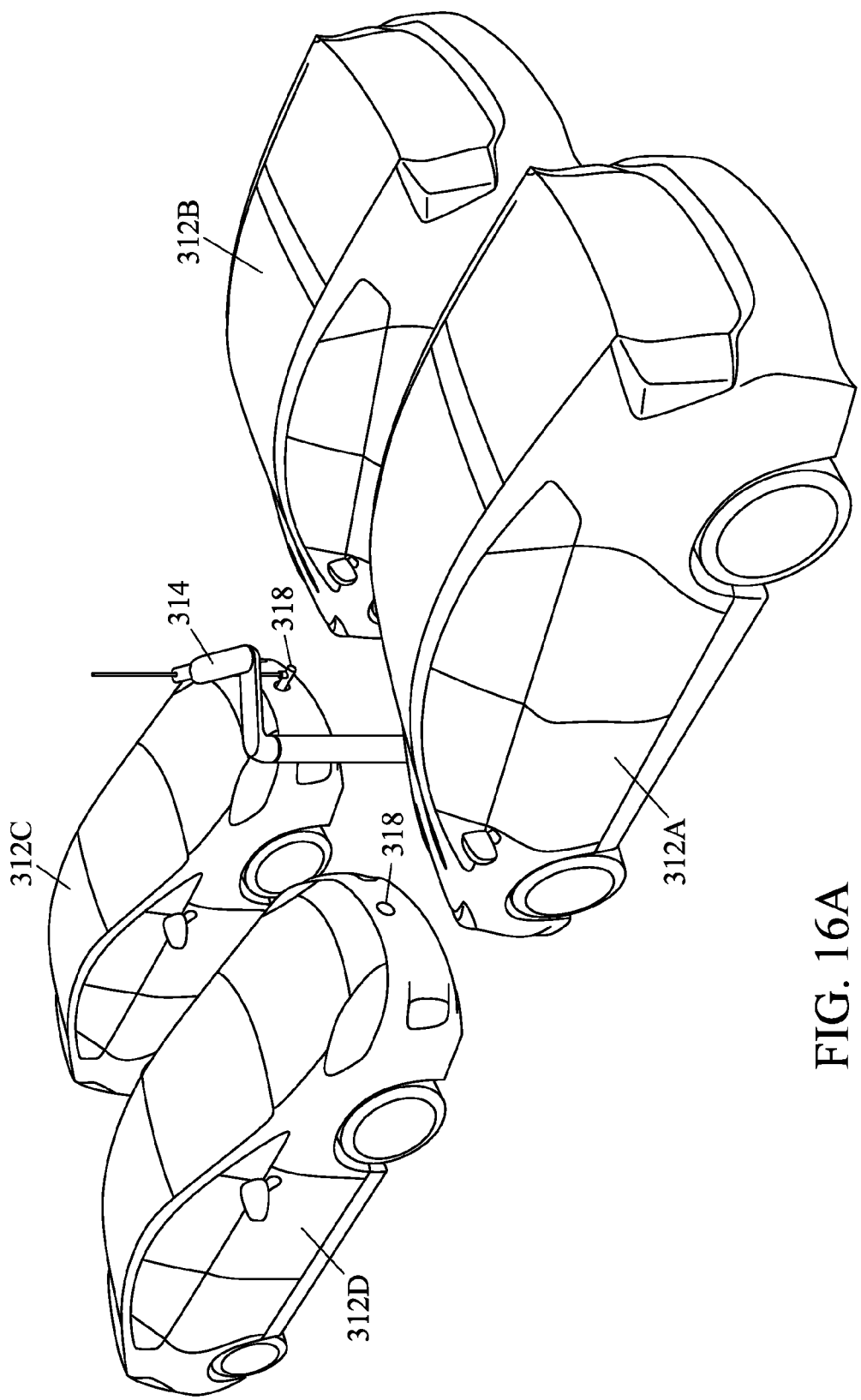
FIG. 16A is an illustrative view of four electric vehicles proximal to a charger at a parking location.
Figure 16B:
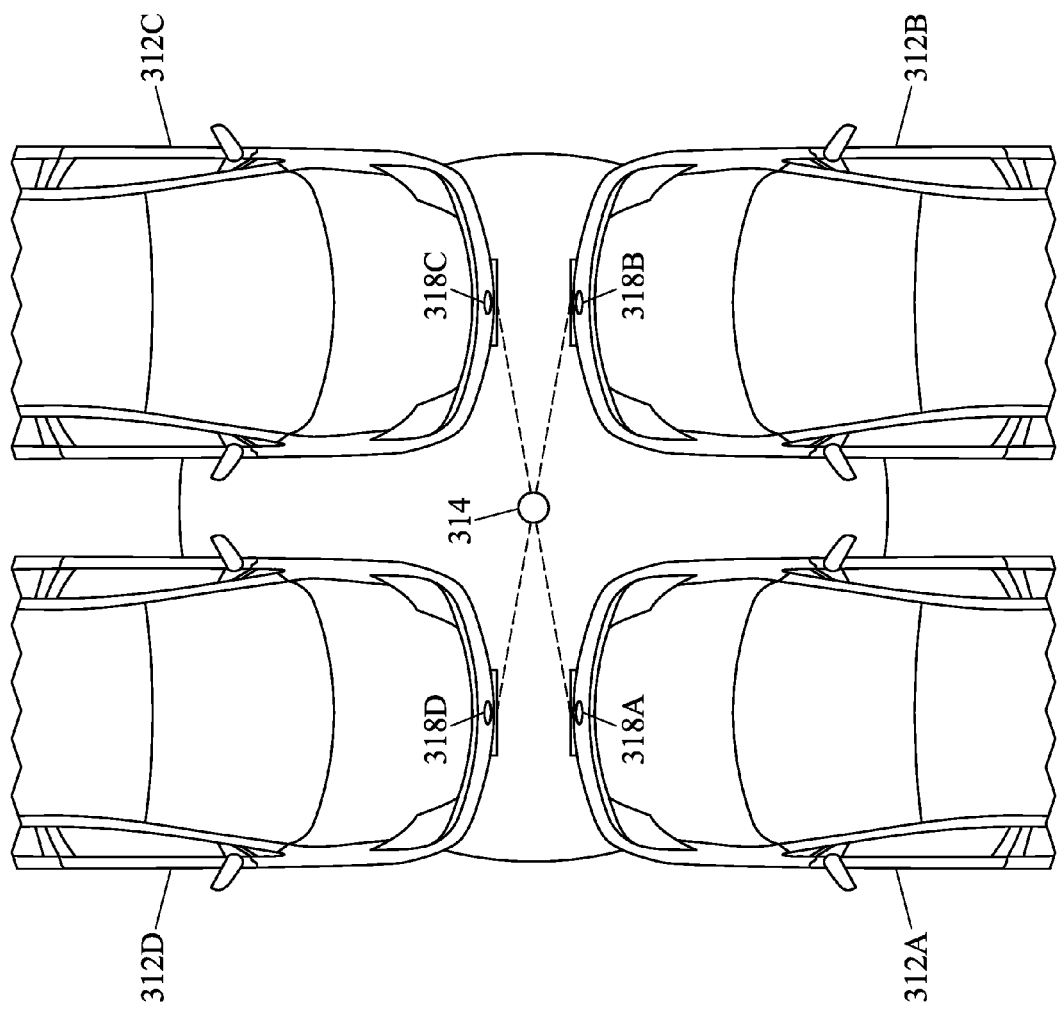
FIG. 16B is a top view of one of the four electric vehicles proximal to the charger of FIG. 16A.

FIG. 14A is an illustrative front view of two electric vehicles (EVs) 312A, 312B (generally, 312) proximal to a charger 314 at a parking location, in accordance with an embodiment. FIG. 14B is a top view of the two electric vehicles 312 proximal to the charger 314 at the parking location shown in FIG. 14A. Although two EVs 312A, 312B are shown, four EVs 312 or more can be proximal to a single charger 314, for example, EVs 312A-312D shown at FIGS. 16A and 16B, each having a charging receptacle for receiving power or the like from the charger 314.

As shown in FIGS. 14A and 14B, each EV 312 is configured with a receptacle 318A, 318B, respectively (generally, 318) constructed and arranged for receiving electricity or related power for charging the corresponding EV 312. The charger 314 can be the same as or similar to robotic chargers in other embodiments of the present inventive concepts. The charger 314 can include a robotic arm 317 having an extent of reach identified by locations proximal to the EV receptacles 318. The articulating arm 317 of the charger 314 can extend and retract to be at or proximal to the first EV 312A and/or the second EV 212B, for example, shown at FIGS. 15A and 15B. In addition to the articulating arm 317 can include one or more joints or the like providing the robotic arm 317 is capable of articulated movement with six degrees of freedom (sixDOF), similar or the same as other embodiments herein. Robotic arms with additional degrees of freedom are also envisioned. While preferably a sixDOF robotic arm is used, certain installations may advantageously use a robotic arm with more joints to clear obstacles between the charger 314 and the one or more EVs 312.

In some embodiments as shown in FIGS. 14A and 14B, a base of the charger 314 can be coupled to a ground surface. In other embodiments as shown in FIGS. 15A and 15B, a base 315 of the charger 314 can be at or near a surface 302 such as a curb, wall, or other side surface.

Figure 17:
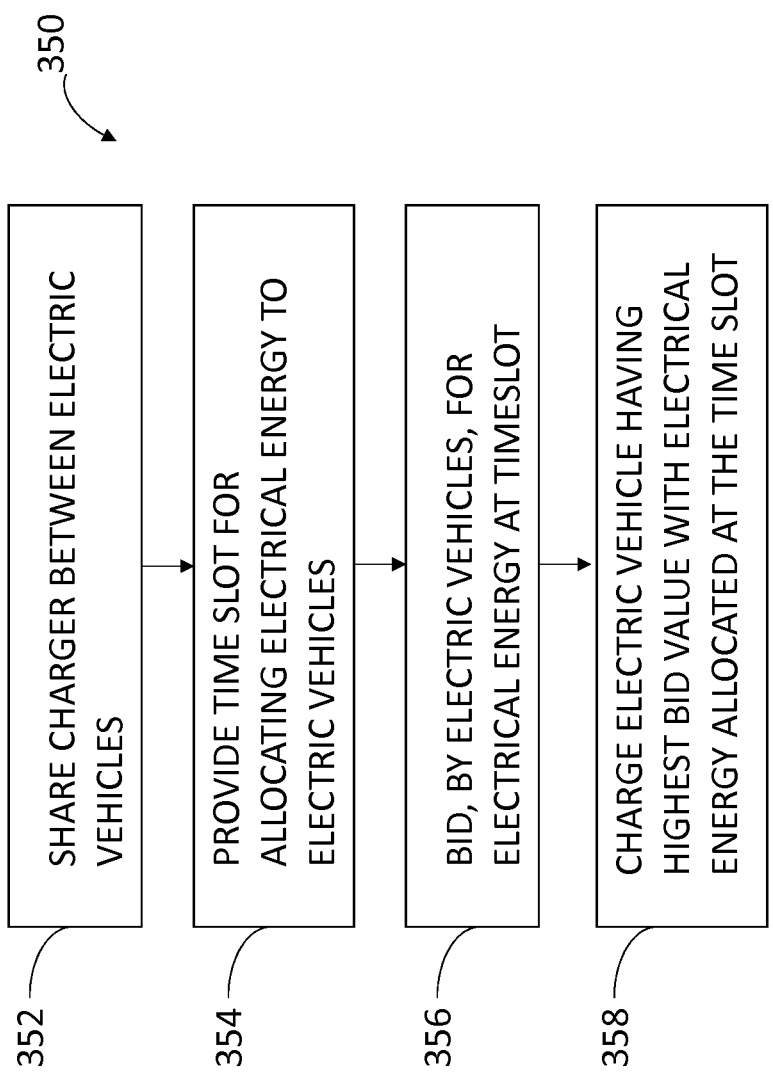
FIG. 17 is a flowchart of a method for dynamic allocation of a charging resource, in accordance with some embodiments.

FIG. 17 is a flowchart of a method 350 for dynamic allocation of a charging resource, in accordance with some embodiments. In describing the method, reference is made to elements of the charger 314 of FIGS. 14-16. For example, some or all of the method can be performed in software running on a computer processor of the charger 314 of FIGS. 14-16, for example, the resource management device 330 shown in FIG. 14A. However, the method 350 is not limited thereto, and thus, chargers or the like in accordance with other embodiments can equally apply.

In an embodiment, the method 350 dynamically allocates finite charger resources, e.g., in pre-allocated time slots, and capacity, e.g., in Watts or related units of measurement, across one or more EVs present for charging, for example, recharging a battery of an EV 312. Robotic mechanisms in the charger 314 are utilized as actors to implement the resource sharing activities. In other embodiments, the allocation of charging resources can be reset with any change in circumstance, such as EVs pulling away from a served parking position.

At block 352 of the method 350, a robotic charger 314 is shared between EVs 312, for example, between 1-4 EVs 312 as shown in FIGS. 14-16. Here, a predetermined charger capacity is served to each EV 312. The charger capacity for a given EV 312 can be set to a maximum electrical energy amount that the individual EV 312 will support. The charger 314 and/or the EV 312 can include a sensor or the like, for example, RF emitter/detector, for sensing when the charger 314 as proximal to or inserted into the EV's receptacle 318, for example, similar or same as other embodiments herein.

At block 354, a time slot is provided for the allocation of electrical energy to one or more of the EVs 312. Here, the resource management device 330 divides a predetermined amount of time into units of time, also referred to as time slots or slices. Each unit of time is available to each and every EV 312 in communication with the robotic charger 314 for receiving an allocation of electrical energy at the time slot. In some embodiments, each unit of time is the same, i.e., the length of time is the same. Alternatively, the units of time can be different. The units of time can be allocated according to specific minimum time slices, for example, 0 seconds.

At block 356, the EVs 312 bid for an allocation of electrical energy at the time slot. For example, each EV 312A-D shown herein can bid for a 1 minute allocation of electrical energy. The resource management device 330 can also control a rate, amount, or the like with respect to the allocation of electrical energy during the time slot. Upon accepting the bid inquiry, the charger 314 can charge the bidding EV 312 according to an allocated unit of time. The allocated time-slices to a served EV 312 can be increased at a fixed (implementation specific) increment, until the charging capacity of the served EV 312 is reached. Accordingly, at block 360, the charger 314 charges at least a portion of a battery of the EV 312 the wins the bid. Details on the bidding process are described in FIG. 18. As described in FIG. 18, an EV 312 that is fully charged has no need for receiving the charger resource, and therefore ceases to bid for a time slot allocated by the charger resource.

Figure 18:
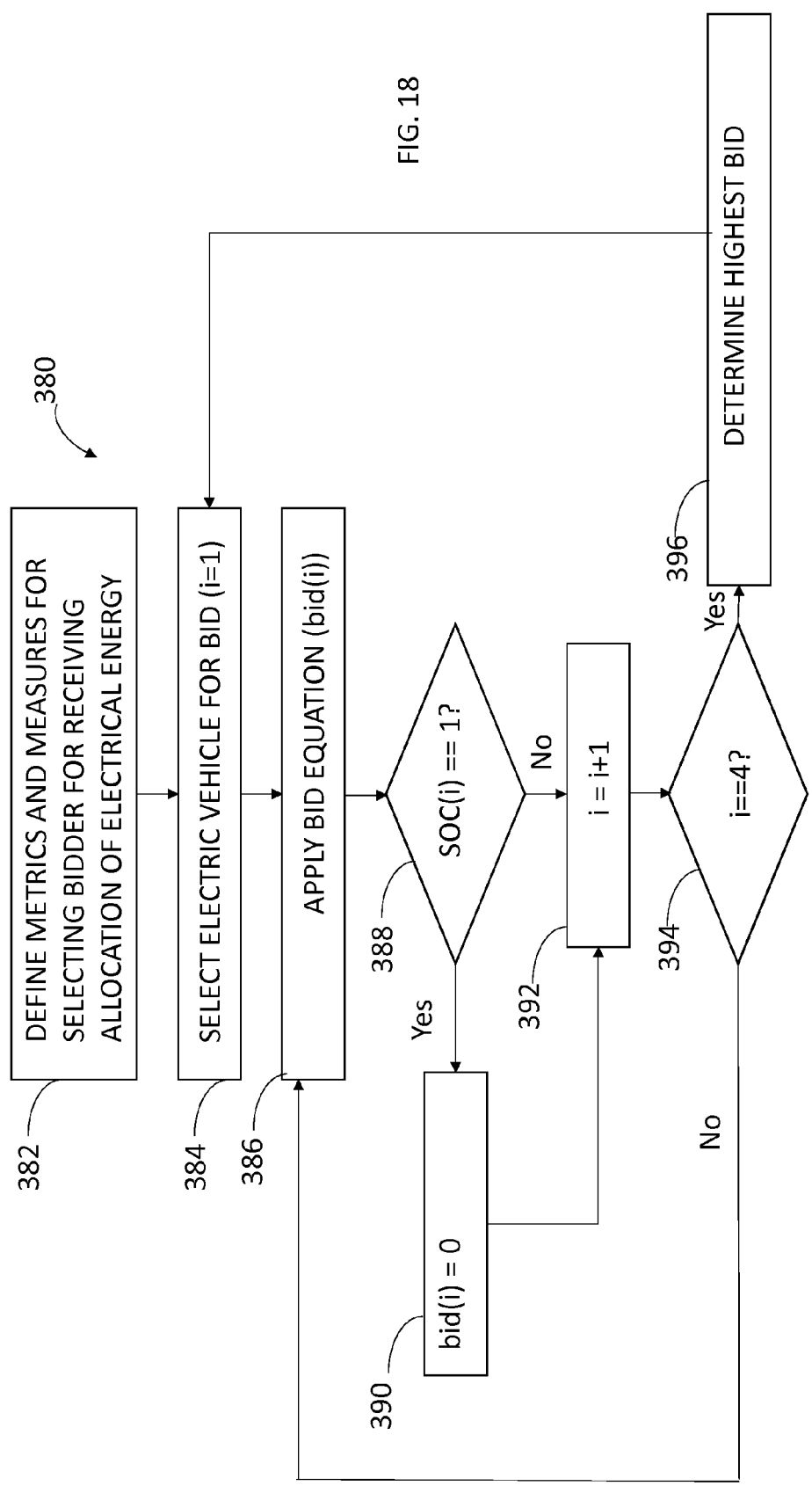
FIG. 18 is a flowchart of a method for determining a bidder for receiving an allocation of a charging resource, in accordance with some embodiments.

FIG. 18 is a flowchart of a method 380 for determining a bidder for receiving an allocation of a charging resource, in accordance with some embodiments. For example, some or all of the method can be performed in software running on a computer processor of the charger 314 of FIGS. 14-16, for example, the resource management device 330 shown in FIG. 14A. However, the method 350 is not limited thereto, and thus, chargers or the like in accordance with other embodiments can equally apply.

At block 382, a context setting that defines metrics, measures, or the like, is provided which can be used for decision making with respect to determining a bidder for receiving an allocation of a charger resource such as electrical energy in a given time slot, for example, generated according to the method 360. In some embodiments, a high miles per hour charge (MPHC) EVs is favored as a function of a state of charge (SOC), but can also apply low MPHC EVs, and also low state of charge (SOC) EVs. As a state of charge (SOC) percentage increases at a given charge rate, the MPHC will decrease, as is well-known to those of ordinary skill in the art with respect to car batteries or the like. In some embodiments, a particular EV time waiting while not charging, described below, is monitored to provide balanced sharing between the EVs 312.

Elements of block 382 can include enumerated limits. In some embodiments, demand response electricity pricing or elastic demand may apply if the dynamically set price of electricity, e.g., measured in cents/kwh, is high for an individual EV 312, for example, as set by human operator of that EV(i)) then that EV(i) will be disfavored in the bidding. In other embodiments, a limit can be imposed according to currently available energy, or state of charge. Here, energy needed for near-term driving needs is based on recent behavior.

At block 384, an EV 312 is selected for presenting a bid for an allocation of electrical energy in a time slot, where i=1 referring to a first EV of a plurality of EVs. At block 386, a bid (bid(i)) is calculated to charge a particular EV(i) during a time slot. In some embodiments, following equation (Eq: 1) in performing a bidding step:

$$\text{bid}(i) = (c0*MPHC(i) + c1*TWS(i) + c2*(1-SOC(i)) + c3 \\ (\text{demandprice}(i) - \text{actual price}) + c4*\text{rand}())  \qquad \text{Eq.: 1:}$$

if SOC=1 (i.e. fully charged) bid(i)=0
max bid (i)I=1→ 4 is awarded the time slot; robotic charger charges EV(i) for that time slot
go to step 358, where bid(i) is determined Accordingly, Eq. 1 determines a calculated bid (bid(i)) to charge a particular EV 312 during a unit of time, also referred to as a slice of time. For method 350, in particular, Eq. 1, "SOC(i)" refers to a state of charge (%), where t(i)=n(i)*T, where "t" refers to continuous time (for example, seconds), "t(i)" refers to time for an EV, "n(i)" refers to a number of total time units allocated to one EV, i=1 4, "T"→refers to a time slice length, and t=sum t(i). Also, "TWS (i)" refers to time waiting in spot, while not charging (for example, seconds). Also, "demandprice (i)" refers to the price EV(i) is willing to pay for electricity, "c0" refers to a bid coefficient for the effect of MPHC(i), high MPHC is favored for bidding, MPHC(i) will decay with increasing SOC so that inherently high MPHC EVs do not "hog" from inherently low MPHC EVs, "c1" refers to a bid coefficient for time waiting TWS(i) for a particular EV(i). An EV that has waited too long gets favored, "c2" refers to a bid coefficient for the SOC(i) of a EV(i). A particular EV(i) that needs more charge (has a lower SOC(i) will be favored. Note the detailed of the term (1−SOC(i)), "c" refers to a bid coefficient for allowing EV(i) to disfavor charging if electricity prices are higher than desired. However, there is still a chance that charging will occur at when actual price exceeds demand price, and "c4" refers to a bid coefficient to induce random perturbations to ensure "race conditions" can be broken. The bid coefficient "c4" can be set to 0 in some embodiments.

At decision diamond 388, a determination is made whether a state of charge of the EV is 1, or 100%, indicating for example, that the EV battery is fully charged. If yes, then the method 380 proceeds to block 390, where bid(i)=0, indicating that the EV is removed from the bidding process. Otherwise, the method 380 proceeds to block 392, wherein a different EV is selected for bidding for the allocated resource. At decision diamond 394, a determination is made whether the number of EVs bidding for the allocated resource in the time slot is at a maximum, for example, 4 EVs have provided bids according to Eq. 1. If yes, then the method 380 proceeds to block 396, where the highest bidder is determined, and the selected EV is charged for the time identified by the time slot.

Figure 19:
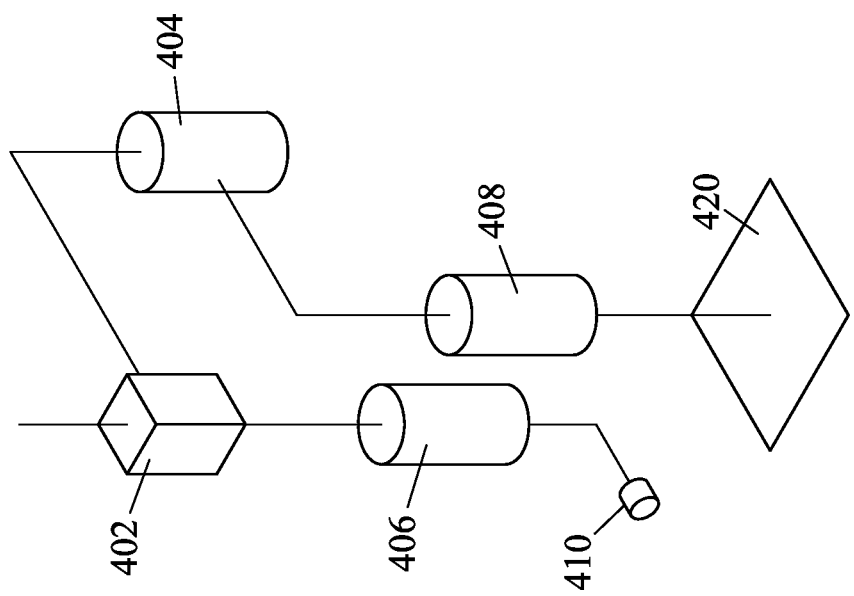
FIG. 19 is a diagram of a kinematic model of a charger, in accordance with an embodiment.
Figure 20:
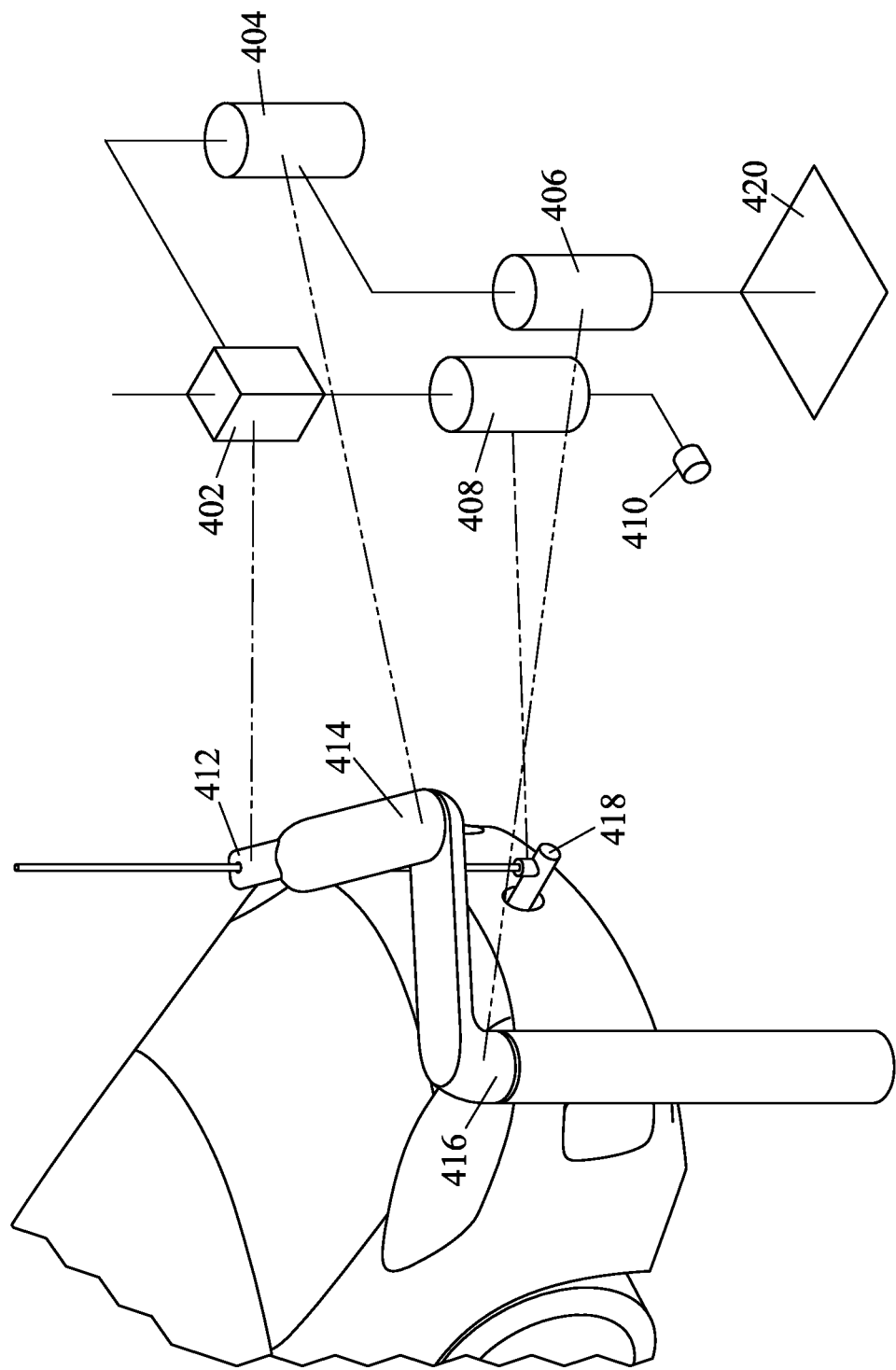
FIG. 20 is a diagram of the kinematic model of FIG. 19 and corresponding elements of a charger, in accordance with an embodiment.

FIG. 19 is a diagram of a kinematic model of a charger, in accordance with an embodiment. FIG. 20 is a diagram of the kinematic model of FIG. 19 and corresponding elements of a charger, in accordance with an embodiment.

The charger can include a linear element 402 and three rotating joints 404, 406, 408. The linear sliding element 402 can move linearly along its own axis. The rotating joints 404, 406, 408 can each rotate about its own axis. The rotating joints 404, 406, 408 can include one or more stepper motors or the like. Collectively, the linear element 402 and three rotating joints 404, 406, 408 can form an articulating arm of the charger and can provide four active degrees of freedom, referred to as four degrees of freedom selective compliant articulated robot arm (SCARA), which can be applied to an articulating arm such as the robotic arm of the charger illustrated at least at FIG. 20.

Other degrees of freedom, referred to as passive degrees of freedom, can be provided that are not actuated by a motor that otherwise generates a motion in at least one of the linear element 402 and three rotating joints 404, 406, 408. A passive degree of freedom can relate to one spring loaded angle or pitch. Another passive degree of freedom can relate to one unconstrained movement, such as a roll.

The charger can be coupled to a reference ground 420 for fixed positioning of a base of the charger (not shown) from which the linear element 402 and three rotating joints 404, 406, 408 can move relative to the base and to each other, thereby providing the abovementioned six degrees of freedom. An electrical connector 410 can be included, which can be similar to other electrical connectors described herein. Details of the electrical connector 410 are therefore not repeated due to brevity.

As shown in FIG. 19, the rotating joints 404, 406, 408 can correspond to robotic joints 414, 416, 418, respectively, of an articulating arm of a charger, and linear element 402 can correspond to a linear actuator or the like 412 at an end of the articulating arm.

FIG. 21 is a table illustrating a comparison of utilization of charger resources, in accordance with some embodiments. The EV charger sharing systems and methods are constructed to maximize the utilization of charger resources, which is important to ensure that a maximum user satisfaction can be delivered at the lowest capital investment cost. Accordingly, the table illustrates benefits of sharing yielding better capital resource utilization with regard to the present inventive concepts (column entitled "PowerHydrant") over conventional power outlays to electric vehicles.

The table in FIG. 21 illustrates two use-case scenarios. The first is a normal charge rate long-term charging window, or workplace charging scenario. Here, provided is a 10 kw charge rate capability in each charger, and a charge demanded by each EV of 21.25 kwh need. An 8 hour charging time window is available.

The second use-case scenario includes a fast Charge Rate Short-term charging window, or roadside charging scenario. Here, provided is a 200 kw charge rate capability in each charger, and a charge demanded by each EV is 21.25 kwh need. A 30 minute charging time window is available.

The "work-hours (w-h) deliverable" (whb) reference refers to the total energy that can be delivered (capacity) by a charger during the charging time window. The charging time window is a representative amount of time that a user could be expected to stay at the charger. E.g., 8 hours at a work place, 12 hours at home over night, 30 minutes for a roadside stop.

The cell marked "w-h delivered" (whd) refers to the total energy that actually has been delivered. The whd value may be lower than the whb value because there is less demand than capacity. If the whd value is significantly lower than the whb value, then utilization or "utility" is adversely effected. This is almost always the case when one charger is allocated to one EV. This is the core rational for sharing in accordance with embodiments of the present inventive concepts.

The cell marked "w-h demanded" (whm) refers to is the energy demanded by the total number of EVs being served by a charger.

"Aggregate customer satisfaction" (acs) is provided where: acs=1−(whm−whd)/whm) is a measure of customer satisfaction that starts at 1, and is subtractively offset by a ratio of unmet-demand to demand. The goal of any system is to achieve high utilization while coming as close as possible to acs=1.

The cell marked "utility" (whd/whb) is a simple ratio of delivered energy in aggregate to deliverable capacity. A low ratio indicates poor utilization of resources. A high ratio indicates good utilization of resources but is measured against customer satisfaction. The utility can relate to a customer getting what he or she needs while maximizing the utilization of a resource.

The cell marked "maximizing satisfaction against capital cost "utility"" (acs*whd/whb) refers to the scaling of utilization by customer satisfaction. That is utilization scaled by satisfaction.

While the invention has been shown and described with reference to specific preferred embodiments, it should be understood by those skilled in the art that various changes in form and detail may be made therein without departing from the spirit and scope of the invention as defined by the following claims.

What is claimed is:

1. An electric charger resource sharing system, comprising:
    a charger that supplies electrical energy to a plurality of electric vehicles, the charger including:
        a robotic arm that articulates to be proximal to each of the electric vehicles for supplying the electrical energy to the electric vehicles; and
        a docking interface at a distal end of the robotic arm that couples with a receptacle on each of the electric vehicles for transferring the electrical energy from the charger to the electric vehicles; and
    a resource management device that receives a bid from each electric vehicle, compares the bids to each other, and allocates a portion of the electrical energy for a predetermined period of time to an electric vehicle of the plurality of electric vehicles having a highest bid of the compared bids in response to the bids of the electric vehicles.

2. The electric charger resource sharing system of claim 1, wherein the resource management device divides a period of time into a plurality of time slots, wherein the predetermined period of time is a time slot of the plurality of time slots, and wherein the robotic arm is allocated to the electric vehicle for receiving the allocated portion of the electrical energy in the time slot.

3. The electric charger resource sharing system of claim 1, wherein the resource management device removes an electric vehicle from a bid selection in response to a determination by the resource management system that the electric vehicle has a maximum state of charge.

4. The electric charger resource sharing system of claim 1, wherein the maximum state of charge is 100% or a manufacturer-specified full charge.

5. The electric charger resource sharing system of claim 1, wherein the charger further comprises a base coupled between the robotic arm and a stationary ground or wall surface.

6. The electric charger resource sharing system of claim 1, wherein the robotic arm includes a plurality of joints for articulating the robotic arm at least at four degrees of freedom to couple with each electric vehicle.

7. The electric charger resource sharing system of claim 5, wherein the joints include rotating joints that include one or more stepper motors for rotating the joints about their own axes.

8. The electric charger resource sharing system of claim 1, wherein the plurality of electric vehicles includes one to four electric vehicles.

9. A method for selecting an electric vehicle for receiving an allocation of a charging resource, comprising:
    selecting each of a plurality of electric vehicles as a candidate for receiving an allocation of a charging resource for a predetermined period of time;
    generating by a computer processor a bid value for each of the plurality of electric vehicles; and
    selecting in response to a highest bid determined from the bid values one of the electric vehicles for receiving the allocation of the charging resource for the predetermined period of time in response to the bid value corresponding to the one of the electric vehicles; and
    providing, by a charger having a robotic arm, the allocation of the charging resource for the predetermined period of time to the selected one of the electric vehicles.

10. The method of claim 9, further comprising: assigning a time slot for the allocated portion of the electrical energy.

11. The method of claim 9, further comprising providing a charger constructed and arranged to supply electrical energy to a plurality of electric vehicles.

12. The method of claim 9, wherein the bid value is a function of a current state of charge.

13. The method of claim 12, wherein an electric vehicle with a maximum state of charge is withdrawn as a candidate for receiving the allocation of the charging resource.

14. The method of claim 9, further comprising dividing a period of time into a plurality of time slots, wherein the predetermined period of time is a time slot of the plurality of time slots, and wherein the robotic arm directly couples to the selected electric vehicle for receiving the allocation of the charging resource.

15. The method of claim 9, wherein the plurality of electric vehicles includes one to four electric vehicles.

16. A computer program product for selecting an electric vehicle for receiving an allocation of a charging resource, comprising:
    a non-transitory computer readable storage medium having computer readable program code embodied therewith, the computer readable program code comprising:
        computer readable program code configured to select each of a plurality of electric vehicles as a candidate for receiving an allocation of a charging resource for a predetermined period of time;
        computer readable program code configured to generate a bid value for each of the plurality of electric vehicles; and
        computer readable program code configured to compare the bids to each other, and select one of the electric vehicles having a highest bid of the compared bids for receiving the allocation of the charging resource for the predetermined period of time in response to the bid value corresponding to the one of the electric vehicles.

* * * * *